United States Patent
Ohara

(10) Patent No.: US 8,190,735 B2
(45) Date of Patent: May 29, 2012

(54) INFORMATION PROCESSING SYSTEM, INFORMATION PROCESSING APPARATUS, AND INFORMATION PROCESSING METHOD

(75) Inventor: Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 12/638,792

(22) Filed: Dec. 15, 2009

(65) Prior Publication Data

US 2010/0161819 A1 Jun. 24, 2010

(30) Foreign Application Priority Data

Dec. 19, 2008 (JP) ................................ 2008-323638

(51) Int. Cl.
*G06F 15/173* (2006.01)

(52) U.S. Cl. ........ 709/224; 709/223; 709/225; 709/226; 709/229

(58) Field of Classification Search ........... 709/223–226
See application file for complete search history.

(56) References Cited

U.S. PATENT DOCUMENTS

| 5,815,649 A * | 9/1998 | Utter et al. ................... 714/6.11 |
| 6,049,885 A * | 4/2000 | Gibson et al. ................. 713/324 |
| 7,779,086 B1 * | 8/2010 | Gammo et al. ............... 709/219 |
| 2006/0010332 A1 | 1/2006 | Nakamura |

FOREIGN PATENT DOCUMENTS

JP 2006-53902 A 2/2006

* cited by examiner

*Primary Examiner* — Brian P Whipple
(74) *Attorney, Agent, or Firm* — Canon U.S.A., Inc., IP Division

(57) ABSTRACT

A first information processing apparatus receives file information from a second information processing apparatus when the information processing apparatus switches into a power saving state. If the first information processing apparatus receives, from a third information processing apparatus, a file process request packet in terms of a file stored in the second information processing apparatus, the first information processing apparatus stores the received file process request packet. When the second information processing apparatus returns into the normal power state, the first information processing apparatus transfers the stored file process request packet to the second information processing apparatus.

17 Claims, 29 Drawing Sheets

FIG. 3

| SIZE (OCTET) | 6 | 6 | 2 | 2 | 96 | 4 |
|---|---|---|---|---|---|---|
| CONTENT | DESTINATION ADDRESS | SENDER ADDRESS | TYPE | FFFFFFFFFFFF | MAC ADDRESS OF PRINTER TO BE ACTIVATED (×6) | FCS |
| | 301 | 302 | 303 | 304 | 305 | 306 |

FIG. 7A

| FILE NAME | AUTHOR | DATE/TIME OF CREATION | FILE ID |
|---|---|---|---|
| 1a | X | 2008/01/01 01:01:01 | asf03abdso |
| 1b | Y | 2008/02/02 02:02:02 | gai88ag09ra |

FIG. 7B

| FILE NAME | AUTHOR | DATE/TIME OF CREATION | FILE ID |
|---|---|---|---|
| 2a | Z | 2008/03/03 03:03:03 | we92agsb9o |

FIG. 7C

| FILE NAME | AUTHOR | DATE/TIME OF CREATION | FILE ID |
|---|---|---|---|
| 3a | X | 2008/04/04 04:04:04 | xowyrav82a |
| 3b | Y | 2008/05/05 05:05:05 | qijnwg8vjsda |

FIG. 11

| USER-SPECIFIED APPARATUS TO BE ACCESSED | IP ADDRESS |
|---|---|
| MFP 101 | IP ADDRESS OF MFP 101 |
| MFP 102 | IP ADDRESS OF MFP 102 |
| MFP 103 | IP ADDRESS OF MFP 103 |

FIG. 18

| USER-SPECIFIED APPARATUS TO BE ACCESSED | IP ADDRESS |
|---|---|
| MFP 101 | IP ADDRESS OF MFP 103 |
| MFP 102 | IP ADDRESS OF MFP 102 |
| MFP 103 | IP ADDRESS OF MFP 103 |

FIG. 20

| FILE NAME | AUTHOR | DATE/TIME OF CREATION |
|---|---|---|
| 1c | Z | 2008/06/06 06:06:06 |

FIG. 21

| FILE NAME | AUTHOR | DATE/TIME OF CREATION | FILE ID |
|---|---|---|---|
| 1a | X | 2008/01/01 01:01:01 | asf13abdso |
| 1b | Y | 2008/02/02 02:02:02 | gai88ag09ra |
| 1c | Z | 2008/06/06 06:06:06 | weu0zxsdfkl |

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

An information processing apparatus is known that has a storage unit configured to store files and various kinds of information. An example of such an information processing apparatus is an MFP (Multi Function Peripheral) having a printing function, a copying function, a communication function, etc. An MFP having a communication function can receive/transmit a file from/to another information processing apparatus.

In recent years, there has been a need for a reduction in power consumption of information processing apparatuses. To meet such a need, for example, an information processing apparatus is switched into a power saving state in which electric power is cut off to a storage unit such as a hard disk for storing files thereby reducing power consumption. However, in this case, if it is requested by an external terminal or the like to read a file or other information stored in the storage unit, electric power is re-supplied to get the storage unit to return into a state in which the information can be read. However, this needs some time and thus a problem occurs that it is difficult for the information processing apparatus to quickly respond to an information acquisition request issued from an external terminal. Besides, because the information processing apparatus returns into the normal power state from the power saving state in response to the information acquisition request, it is difficult to achieve a sufficient reduction in the power consumption of the information processing apparatus.

To solve the above problems, it has been proposed to configure an information processing apparatus such that when an information acquisition request is received from an external terminal when the information processing apparatus is in the power saving state, a quick response is performed using duplicate information stored in advance in another information processing apparatus while maintaining the power saving state (see, for example, Japanese Patent Laid-Open No. 2006-53902).

The technique disclosed in Japanese Patent Laid-Open No. 2006-53902 allows the information processing apparatus to quickly respond to an information acquisition request issued from an external terminal when the information processing apparatus is in the power saving state while the information processing apparatus remains in the power saving state.

However, even in the information processing apparatus disclosed in Japanese Patent Laid-Open No. 2006-53902, when the information processing apparatus in the power saving state receives a process request from another apparatus, if the process request is for a file stored in the information processing apparatus, it is necessary to re-start supplying of the electric power to the storage unit to perform the requested process. Thus, the retuning into the normal power state from the power saving state makes it difficult to achieve a sufficient reduction in the power consumption of the information processing apparatus. If the information processing apparatus is maintained in the power saving state to achieve a high reduction in the power consumption, a problem occurs that a processing request for a file stored in the information processing apparatus is not performed.

SUMMARY OF THE INVENTION

In view of the above, the present invention provides an improved information processing system, information processing apparatus, and information processing method.

According to an aspect of the present invention, there is provided an information processing system including a first information processing apparatus and a second information processing apparatus capable of communicating with the first information processing apparatus, in which if the second information processing apparatus switches into a power saving state in which electric power is cut off at least to a storage unit, when a process request is issued thereafter for a file stored in the second information processing apparatus, the requested process for the file stored in the information processing apparatus is performed while maintaining the information processing apparatus in the power saving state.

Further features of the present invention will become apparent from the following description of exemplary embodiments with reference to the attached drawings.

BRIEF DESCRIPTION OF THE DRAWINGS

FIG. 3 is a diagram illustrating an example of an activation packet.

FIGS. 7A to 7C are diagrams illustrating file information stored in a storage area A of a hard disk of respective MFPs of the image processing system.

FIG. 11 is a diagram illustrating an IP address management table.

FIG. 18 is a diagram illustrating an IP address management table managed by the MFP 102 that has received the switch-to-power-saving-state notification packet.

FIG. 20 is a diagram illustrating file information associated with a file that is specified, by a file storage request issued by a user of the MFP 102, to be stored in the MFP 101.

FIG. 21 is a diagram illustrating file information of the MFP 101 stored in the storage area A 401 of the hard disk 211 of the MFP 103.

DESCRIPTION OF THE EMBODIMENTS

Embodiments of the present invention are described below with reference to the accompanying drawings. Note that constituent elements in the following embodiments are described merely by way of example, and the present invention is not limited to these constituent elements.

First Embodiment

Figure 1:
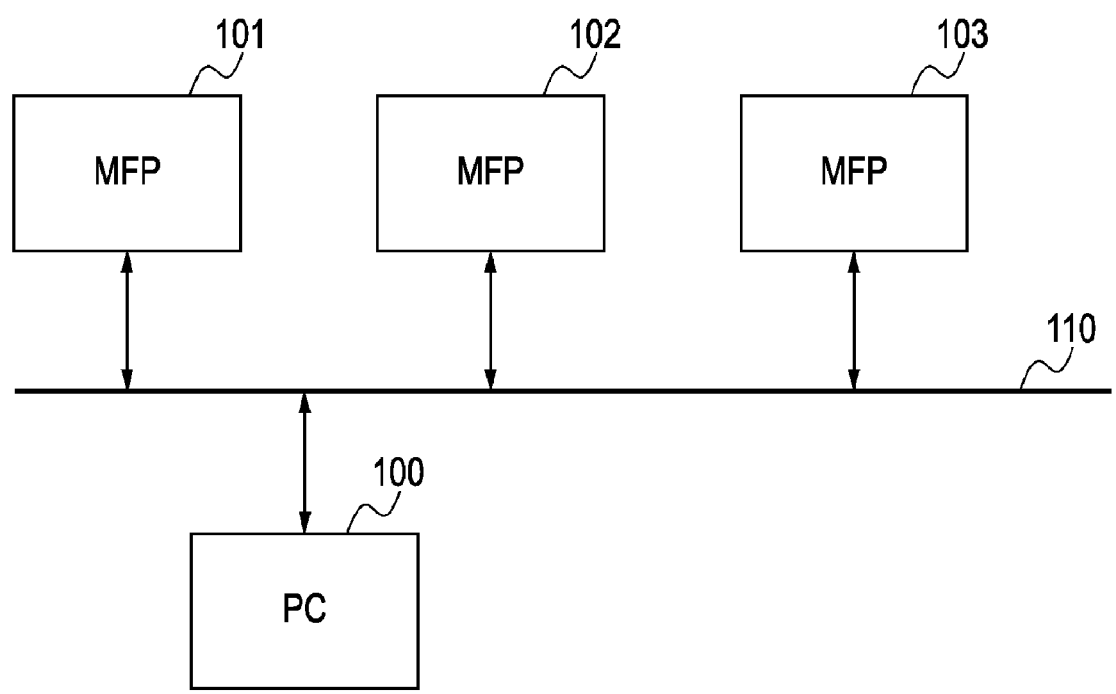
FIG. 1 is a block diagram illustrating a configuration of an image processing system according to an embodiment of the present invention.

FIG. 1 is a block diagram illustrating a configuration of an information processing system according to a first embodiment of the present invention.

The information processing system includes a MFP 101, a MFP 102, and MFP 103 serving as information processing apparatuses, and a PC 100 serving as an external terminal. In the information processing system, the respective apparatuses are connected to each other via a LAN (Local Area Network) such that they can communicate with each other.

The PC 100 has a function of a personal computer in which an OS (Operating System) and application programs running on the OS have been installed. Furthermore, the PC 100 has a printer driver installed therein that is capable of converting a file generated by an application program into print data in a format printable by the MFPs 101 to 103. The print data output from the printer driver is transmitted to an apparatus selected by a user from the MFPs 101 to 103 and the PC 100.

Figure 2:
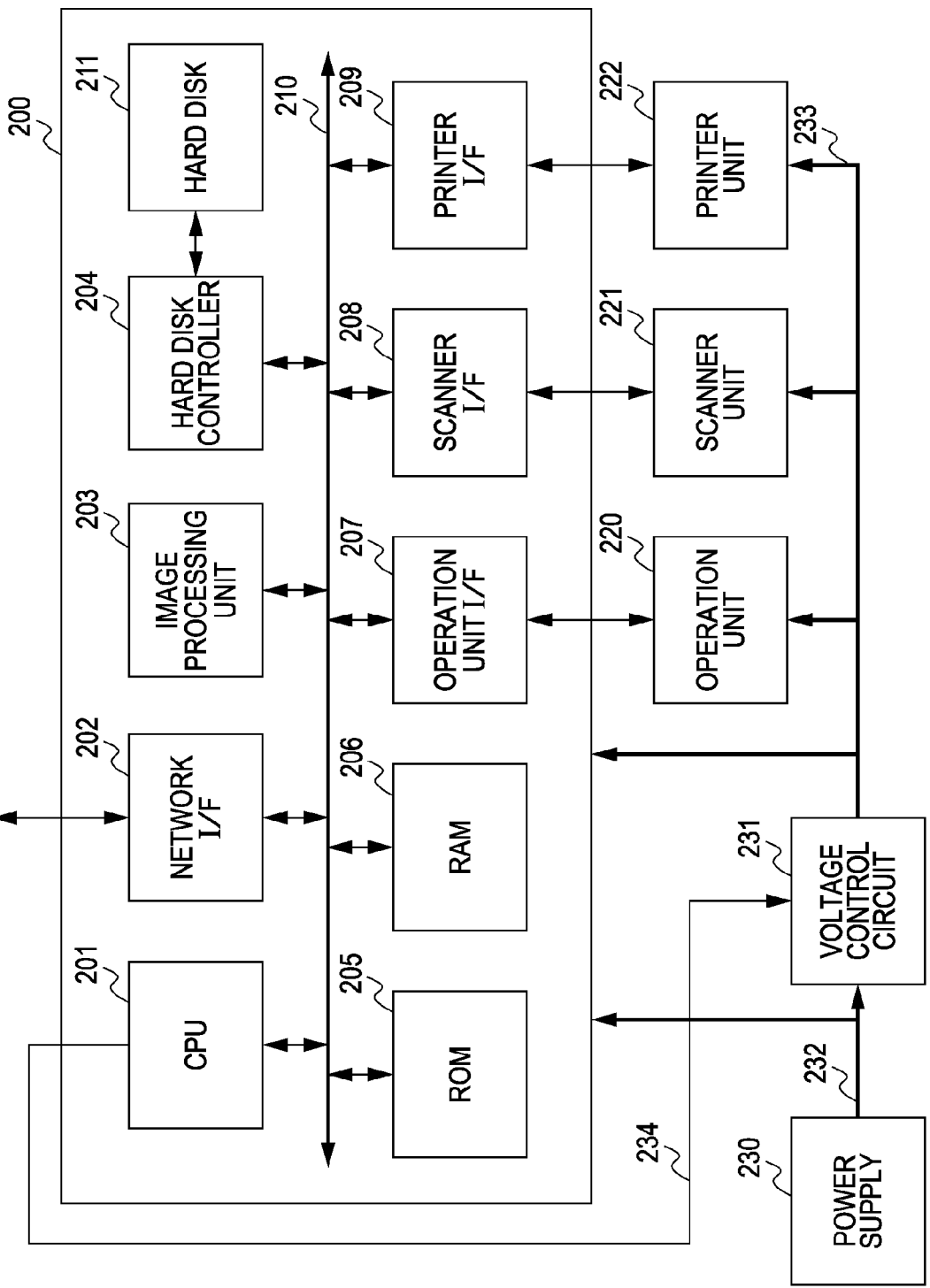
FIG. 2 is a block diagram illustrating a configuration of an MFP 101.

FIG. 2 is a block diagram illustrating a configuration of the MFP 101. Note that the MFP 102 and the MFP 103 also have a similar configuration.

The MFP 101 includes a controller unit 200 that controls the entire MFP 101, a scanner unit 221 serving as an image input unit, a printer unit 222 serving as an image output unit, and an operation unit 220 serving as an operation unit.

The scanner unit 221 acquires image data by illuminating an image of a document with a light source such as an LED and detecting light reflected from the document by an image pickup device. The scanner unit 221 transmits the acquired image data to the controller unit 200. The transmitted image data is stored in the RAM 206 or the hard disk 211.

The printer unit 222 receives image data from the controller unit 200 and forms an image on paper in accordance with the received image data. The image may be formed by a proper technique such as electrophotograpy, an ink-jet printing technique, etc.

The controller unit 200 is electrically connected to the scanner unit 221 and the printer unit 222 via a scanner interface 208 and a printer interface 209, respectively. The controller unit 200 is capable of communicating with the PC 100, the MFP 102, and the MFP 103 via the LAN 110. The controller unit 200 includes various parts which are described below.

A CPU 201 loads a control program from a ROM 205 to a RAM 206 and executes it thereby generally controlling the various parts in the controller unit 200 via the system bus 210.

The RAM 206 is used by the CPU 201 as a system work memory in which the control program or the like is stored and executed. The RAM 206 is also used to temporarily store image data acquired by the scanner unit 221 and a file received via the LAN 110. The RAM 206 may be an SRAM capable of retaining stored contents even after electric power supplied from a power supply 230 is turned off or may be a DRAM. In the case where a DRAM is used, contents stored in it are lost when the electric power is turned off. In the ROM 205, the control program (boot program) executed by the CPU 201 is stored.

The operation unit interface 207 is an interface unit for connecting the operation unit 220 to the system bus 210. When the operation unit interface 207 receives image data to be displayed on the operation unit 220, which also functions as a display unit, from the RAM 206 via the system bus 210, the operation unit interface 207 transfers the received image data to the operation unit 220. When the operation unit interface 207 receives information for operating the MFP 101 input from the operation unit 220, the operation unit interface 207 transfers the received information to the CPU 201 via the system bus 210.

A network interface 202 is connected to the LAN 110 and the system bus 210. The network interface 202 performs an input process to input information via the LAN 110 and an output process to output information via the LAN 110.

A hard disk controller 204 writes and reads information to/from a hard disk 211 under the control of the CPU 201. For example, the information (files, image data, etc.) stored in the RAM 206 is stored on the hard disk 211 or the information stored on the hard disk 211 is output to the RAM 206 by the hard disk controller 204.

The hard disk 211 is a nonvolatile storage unit for storing various kinds of information/data such as system software used to control the MFP 101, image data acquired by the scanner unit 221, information (a file, image data, etc.) input via the LAN 110, etc.

An image processing unit 203 performs various kinds of image processing such as correcting, modifying, editing, etc. on image data input from the scanner unit 221 via the scanner interface 208. The image processing unit 203 also performs various kinds of image processing such as correcting, modifying, editing, etc. on image data to be output to the printer unit 222 via the printer interface 209.

The power supply 230 always receives a voltage generated by a commercial power source as long as a main switch (not shown) of the MFP 101 is in an ON state. The power supply 230 supplies a voltage to a voltage control circuit 231 and a controller 200 via a main power supply line 232.

When the MFP 101 operates in a normal power state (described below), the voltage control circuit 231 supplies a voltage via a sub power supply line 233 to the operation unit 220, the scanner unit 221, the printer unit 222, and the controller unit 200. On the other hand, when the MFP 101 operates in a power saving state (described later), the voltage control circuit 231 cuts off the voltage supplied via the sub power supply line 233. In the operation, in accordance with a command given by the CPU 201 via a control signal line 234 (described later), the voltage control circuit 231 controls whether the voltage from the power supply 230 is supplied via the sub power supply line 233.

In FIG. 2, both the main power supply line 232 and the sub power supply line 233 are connected to the controller unit 200 such that the main power supply line 232 is connected to the CPU 201, the network interface 202, and the RAM 206, and the sub power supply line 233 is connected to the image processing unit 203, the hard disk controller 204, the hard disk 211, the ROM 205, the operation unit interface 207, the scanner interface 208, and the printer interface 209.

Reference numeral 234 denotes a control signal line for controlling the power supply in accordance with a control signal from the CPU 201 in terms of the switching of the power state of the MFP 101 between the power saving state and the power saving state.

Now, the power state of the MFP 101 is explained below.

The MFP 101 operates in either the normal power state or the power saving state.

In the normal power state, the voltage is supplied from the power supply 230 via the main power supply line 232 and the voltage is also supplied over the sub power supply line 233 via the voltage control circuit 231. On the other hand, in the power saving state, no voltage is supplied over the sub power supply line 233 via the voltage control circuit 231 although the voltage is supplied via the main power supply line 232 from the power supply 230.

In the normal power state, the MFP 101 is capable of performing a copy operation, a print operation, a transmission operation, and a reception operation. In the copy operation, the printer unit 222 forms an image on paper in accordance with image data supplied from the scanner unit 221. In the print operation, the printer unit 222 forms an image on paper in accordance with print data received from the PC 100 via the network interface 202. In the transmission operation, the MFP 101 transmits various kinds of data such as a file stored on the hard disk 211 to the PC 100 or the like via the network interface 202. In the reception operation, the MFP 101 receives various kinds of data such as a file from the PC 100 or the like via the network interface 202 and stores the received data in the hard disk 211.

Note that the MFP 101 is not always performing the copying operation, the print operation, or other operations. If the MFP 101 comes into a non-operation state, the CPU 201 controls the voltage control circuit 231 such that electric power is cut off to particular one or more parts of the MFP 101. When one of conditions described below is met, the CPU 201 determines that the MFP 101 has come into the non-operation state, and the CPU 201 controls the voltage control circuit 231 to cut off electric power supplied via the sub power supply line 233.

(1) No image data has been input from the scanner unit 221 in a predetermined period of time.

(2) No data has been received via the network interface 202 in a predetermined period of time.

(3) No user operation on the operation unit 220 has been performed in a predetermined period of time.

In addition to the conditions (1) to (3) described above, other conditions may be checked to make a determination as to the non-operation state. For example, a power save key (not shown) may be disposed on the MFP 101, and if the power save key is pressed by a user (operator) of the MFP 101, the CPU 201 may determine that the MFP 101 has come into the non-operation state. Alternatively, a user of the MFP 101 may set, via the operation unit 220, a period of time such that when the period of time elapsed, the MFP 101 is switched into the power saving state. In this case, if a timer (not shown) detects that the period of time specified by the user has elapsed, the CPU 201 of the MFP 101 may switch the power state of the MFP 101 into the power saving state from the normal power state.

When the MFP 101 is operating in the power saving state, the network interface 202 monitors an arrival of an activation packet (return-to-normal-state command) that causes the MFP 101 to return into the normal power state from the power saving state. Note that the network interface 202 ignores any packet other than the activation packet. When the CPU 201 determines that an activation packet is received, the CPU 201 transmits a switch-to-normal-state signal to the voltage control circuit 231 via a control line 234. Upon receiving the switch-to-normal-state signal from the CPU 201, the voltage control unit 231 performs a control operation such that a voltage is supplied via the sub power supply line 233.

FIG. 3 illustrates an example of an activation packet. In FIG. 3, reference numeral 301 denotes a destination address field in which a destination MAC address is described. Reference numeral 302 denotes a sender address field in which a sender MAC address is described.

Reference numeral 303 denotes a type field in which a high-level protocol is described. Reference numerals 304 and 305 denote data fields in which data specific to an activation packet is described. More specifically, a synchronization stream "FFFFFFFFFFFF" is described in the data field 304, while the MAC address of the destination, i.e., the MFP 101 in this case, to which the activation packet is to be sent is described continuously 16 times in the field 305. Reference numeral 306 denotes an FCS field in which a CRC (Cyclec Redundancy Check) value is described. Note that the activation packet does not necessarily need to be described in the above-mentioned format, but the activation packet may be described in a properly defined other format.

Next, a method of managing files in the MFP 101 is explained. Note that files are managed in a similar manner in the MFP 102 and the MFP 103 although explanations thereof are omitted.

Figure 4:
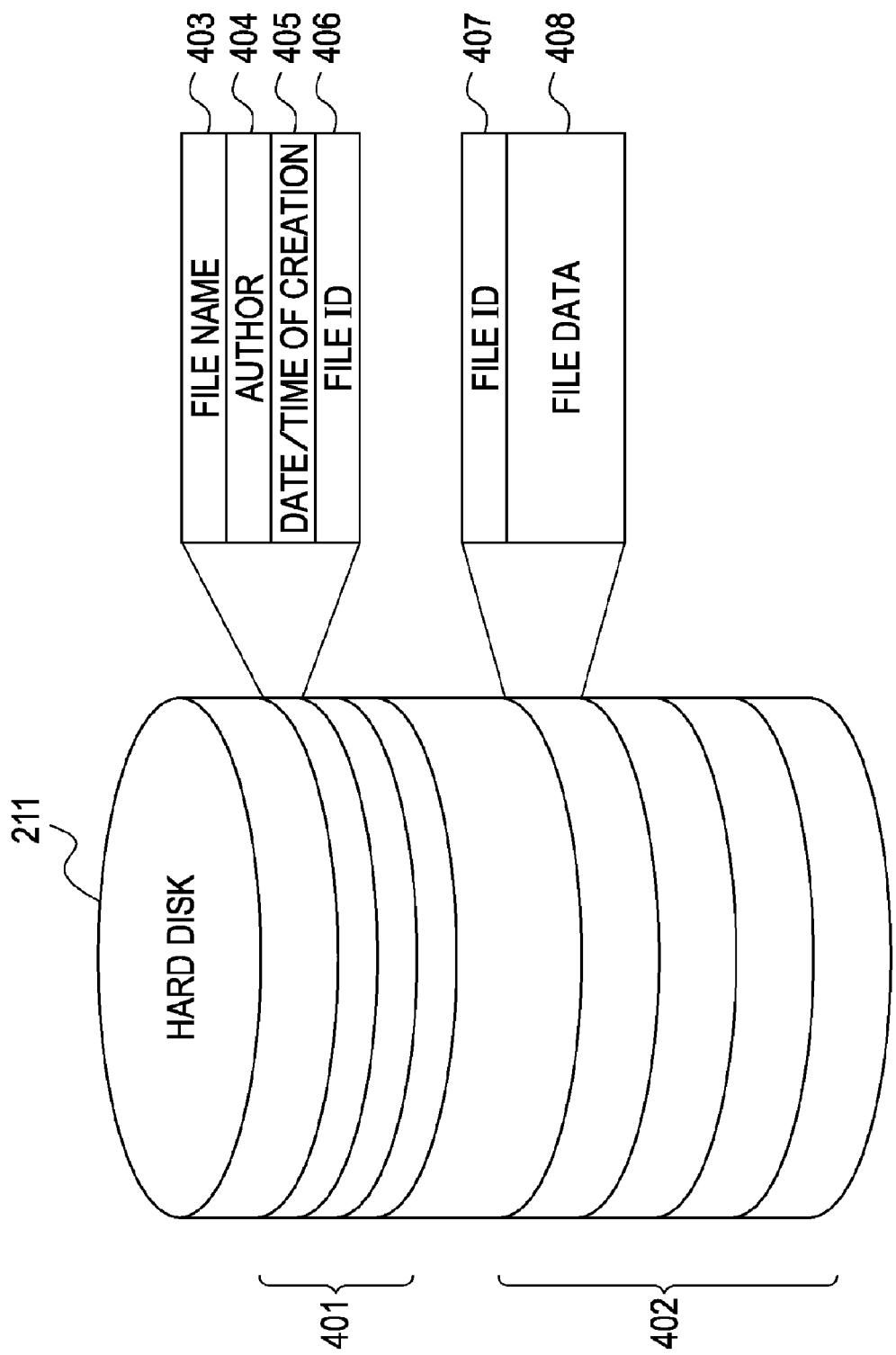
FIG. 4 is a diagram illustrating a manner in which files are stored on a hard disk 211 of the MFP 101.

FIG. 4 illustrates a manner in which files are stored on the hard disk 211 of the MFP 101. As shown, information indicating file attributes such as a file name, an author of the file, etc. (hereinafter referred to simply as file information) is described separately in a storage area A 401 and a storage area B 402.

More specifically, in the storage area A 401, file information associated with all files stored on the hard disk 211 is stored. The storage area A 401 includes a file name management area 403, an author management area 404, a creation date/time management area 405, and a file ID management area 406. Note that the file information is not file data itself but information indicating an attribute of file data.

In the storage area B 402, file data associated with all files stored on the hard disk 211 is stored. The storage area B (402) includes a file ID management area 407 and a file data management area 408.

In the first embodiment, the correspondence between the file information stored in the storage area A 401 and the file data stored in the storage area B 402 is achieved using file IDs. For example, to acquire a file with a particular file name, the hard disk controller 204 acquires the file via a following procedure. First, the particular file name is retrieved from the file name management area 403 in the storage area A 401, and a file name corresponding to the retrieved file name is acquired from the file ID management area 406. Next, the hard disk controller 204 refers to the file ID management area 407 and acquires a file corresponding to the acquired file ID from the file data management area 408.

Next, a file sharing service provided by the MFP 101, the MFP 102, and the MFP 103 to other apparatuses on the LAN 110 is explained below.

The file sharing service refers to a service that allows files (print data, image data, etc.) stored on hard disks of the respective MFPs to be accessed by other MFPs or the PC 100. In other words, the file sharing service allows the respective MFPs and the PC 100 to acquire files stored in other MFPs.

In the following explanation, by way of example, it is assumed that the MFP 101 is an apparatus that provides the file sharing service, and the MFP 102 is an apparatus that receives the file sharing service from the MFP 101. When the MFP 102 requests the MFP 101 to provide the file sharing service, the MFP 102 transmits a file information request packet to the MFP 101.

Figure 5:
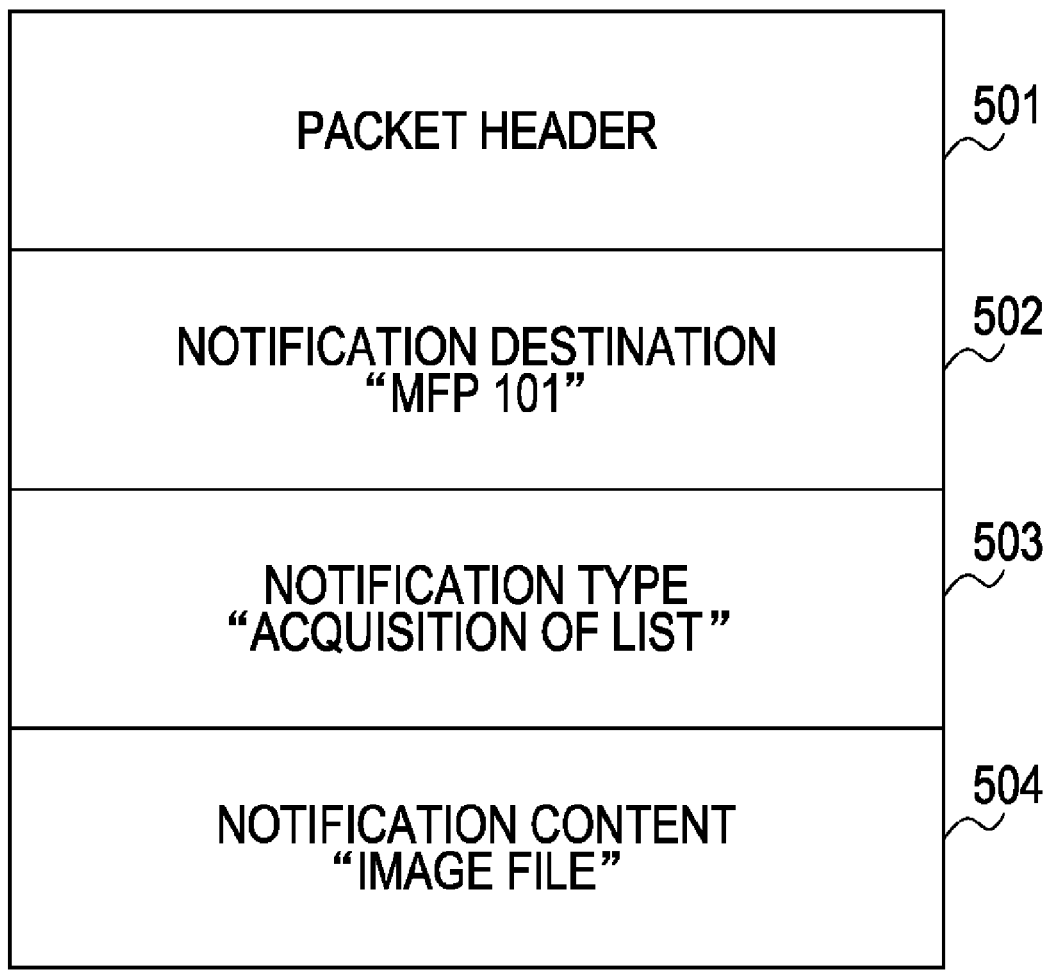
FIG. 5 is a diagram illustrating an example of a file information request packet transmitted from the MFP 101 to an MFP 102.

FIG. 5 is a diagram illustrating an example of a file information request packet transmitted from the MFP 102 to the MFP 101. Reference numeral 501 denotes a packet header part. In a case where the network is based on the TCP/IP network architecture, a sender IP address, a destination IP address, a protocol ID, etc. are described in the packet header part 501.

Reference numeral 502 denotes a notification destination description field, reference numeral 503 denotes a notification type description field, and reference numeral 504 denotes a notification content field.

In the example shown in FIG. 5, the MFP 101 is specified as the notification destination, a file list is specified as the notification type, and a file is specified as the notification content.

FIG. 11 is a diagram illustrating an IP address management table 1100 managed by the MFP 102. In the IP address management table 1100, reference numeral 1101 denotes a field in which an IP address of the MFP 101 is described. Reference numeral 1102 denotes a field in which an IP address of the MFP 102 is described. Reference numeral 1103 denotes a field in which an IP address of the MFP 103 is described. When a file information request packet is transmitted to the MFP 101 specified by a user, the MFP 102 generates a file information request packet in which an IP address of the MFP 101 defined in the IP address management table is described in the notification destination description field 502.

If the MFP 101 receives the file information request packet generated by the MFP 102, the CPU 201 of the MFP 101 instructs the hard disk controller 204 to acquire the file information stored in the storage area A 401. The hard disk controller 204 acquires the file information from the storage area A 401 of the hard disk 211 and stores the acquired file information in the RAM 206. The hard disk controller 204 then notifies the CPU 201 that the file information has been stored in the RAM 206. Upon receiving the notification, the CPU 201 instructs the network interface 202 to transmit the file information stored in the RAM 206 to the MFP 102. In response to the instruction given by the CPU 201, the network interface 202 transmits the file information stored in the RAM 206 to the MFP 102.

Thus, the MFP 102 is capable of acquiring the file information (file list) of all files stored on the hard disk 221 of the MFP 101 in the above-described manner.

Figure 6:
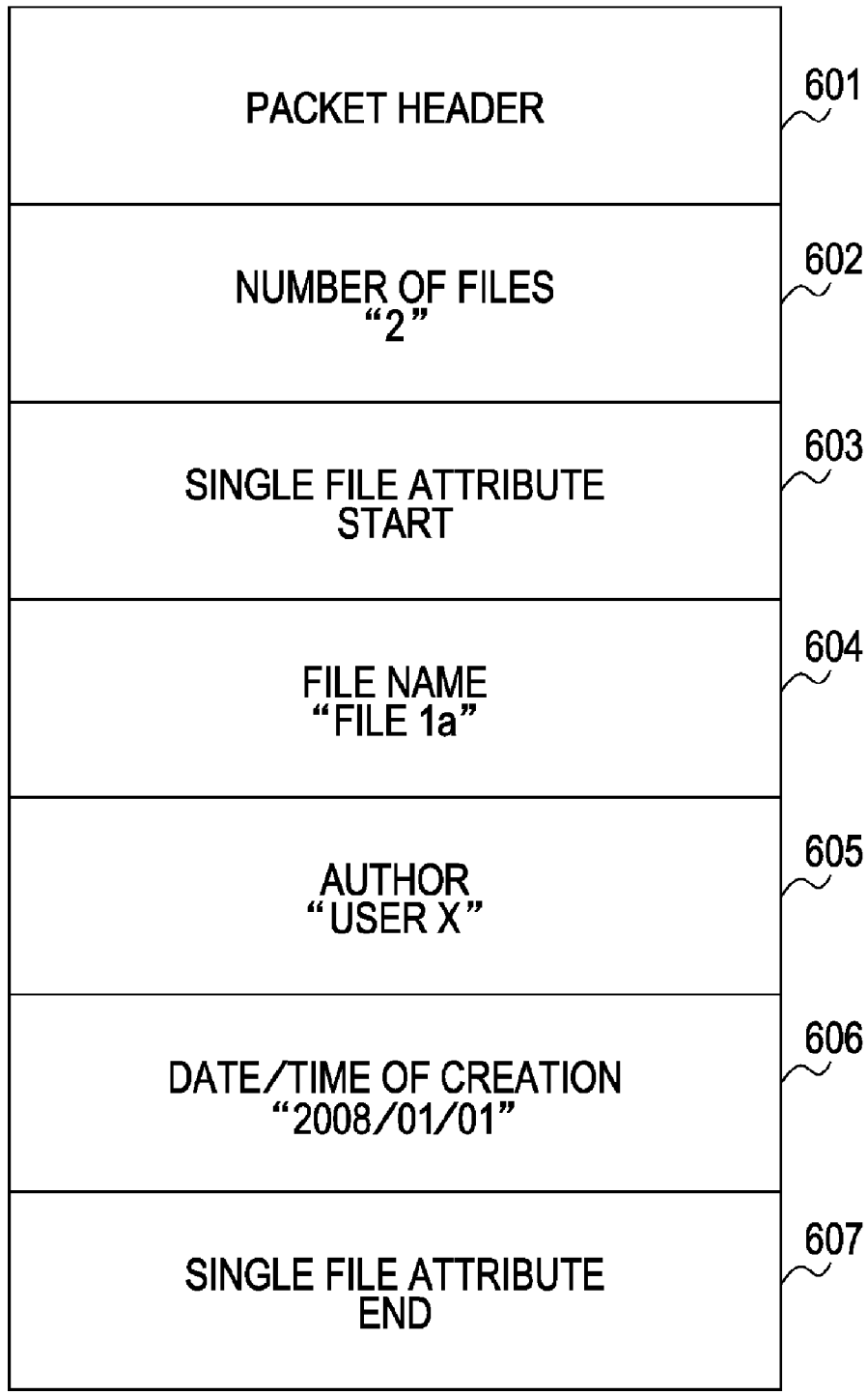
FIG. 6 is a diagram illustrating an example of a response packet that is transmitted by the MFP 101 in response to the file information acquisition request received from the MFP 102.

FIG. 6 illustrates an example of a response packet that is transmitted by the MFP 101 in response to the file information acquisition request packet received from the MFP 102. The response packet includes a packet header part 601 and, following it, a number-of-files description field 602 in which a description is placed as to the number of files to be returned as the file list, After the number-of-files description field 602, a file name 604, an author 605, and a creation date/time 606 are described as file information for each file. Note that the file information is put between a single file attribute start part 603 and a single file attribute end part 607. In the example shown in FIG. 6, the part between the single file attribute start part 603 and the single file attribute end part 607 includes a file name description field 604, an author description field 605, and a creation date/time description field 606. This part may include additional description fields in which other attributes are described as required.

The MFP 102 can acquire file information stored on the hard disk 211 of the MFP 101 by receiving a response packet shown in FIG. 6. Based on the acquired file information, the MFP 102 can display, on the operation unit of the MFP 102, a list of files stored on the hard disk 211 of the MFP 101. If a user selects a particular file from the list of files displayed on the operation unit, the MFP 102 generates a file data acquisition request packet (not shown) to acquire the selected file from the MFP 101. The file data acquisition request packet includes information specifying the file to be acquired. For example, a file name may be used as the information for this purpose. If the MFP 101 receives the file data acquisition request packet from the MFP 102, the MFP 101 refers to the storage area A 401 of the hard disk 211 and acquires the file data specified by the file data acquisition request packet from the storage area B 402. The MFP 101 transmits the file acquired from the hard disk 211 to the MFP 102 via the network interface 202. Thus, the MFP 102 can acquire the file requested by the user from the MFP 101.

The MFP 101 provides the file sharing service to the MFP 102 in the manner described above. The MFP 101 is capable of switching into the power saving state in the above-described manner. However, in a case where the MFP 101 receives a file information acquisition request packet or a file data acquisition request packet when the MFP 101 is in the power saving state, a problem can occur because, if the MFP 101 is switched into the normal power state to acquire file information or file data, the MFP 101 is not maintained in the power saving state.

In the first embodiment, in view of the above, when the MFP 101 is operating in the power saving state, if a file information acquisition request or a file data acquisition request addressed to the MFP 103 is issued by the MFP 102 or other apparatuses, then the MFP 103 responds, by proxy, to such a request. Because the MFP 103 (first information processing apparatus) responds to requests by proxy for the MFP 101 (second information processing apparatus), the MFP 101 can maintain its power saving state.

FIGS. 7A to 7C illustrate file information stored in the storage area A of the hard disk of each MFP (101, 102, and 103) in the information processing system.

FIG. 7A illustrates file information stored in the MFP 101, FIG. 7B illustrates file information stored in the MFP 102 and FIG. 7C illustrates file information stored in the MFP 103.

Next, an explanation is given as to a process performed by the MFP 101 to switch from the normal power state into the power saving state.

Figure 8:
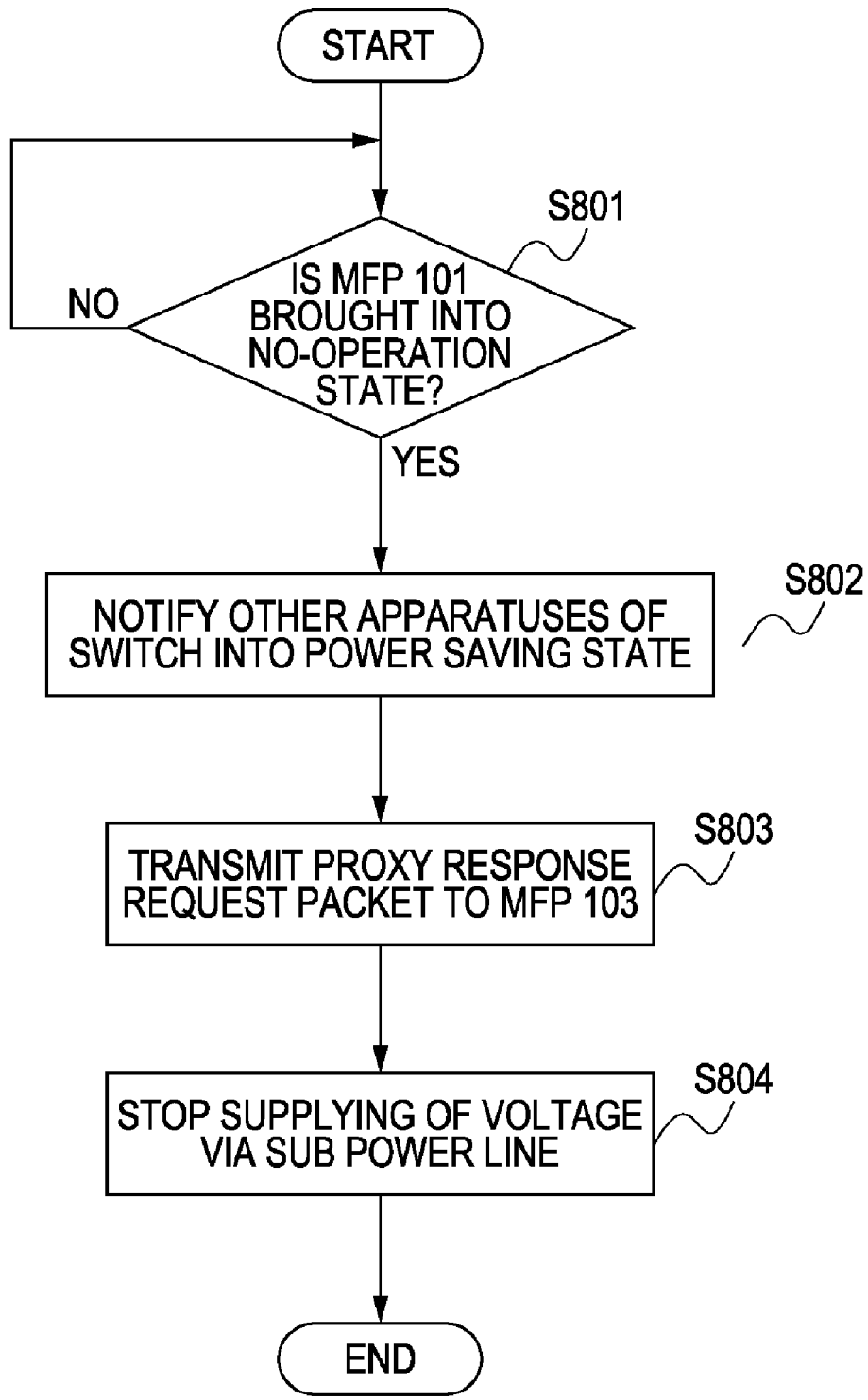
FIG. 8 is a flow chart illustrating a process performed by the MFP 101 to switch into the power saving state from the normal power state.

FIG. 8 is a flow chart illustrating the process performed by the MFP 101 to switch from the normal power state into the power saving state. In the first embodiment, by way of example, it is assumed that the MFP 103 handles by proxy a file information request or the like addressed to the MFP 101 when the MFP 101 is in the power saving state.

Steps in FIG. 8 are executed by the CPU 201 of the MFP 101. In the execution of these steps the CPU 201 loads a control program into the RAM 206 from the hard disk 211 or the ROM 205 and executes it.

In step S801, the CPU 201 determines whether a non-operation state occurs when the MFP 101 is operating in the normal power state. If it is determined that the MFP 101 has entered the non-operation state, the CPU 201 advances the process to step S802. Note that when one of conditions (1) to (3) described above is met, the CPU 201 determines that the MFP 101 has entered the non-operation state.

In step S802, the CPU 201 instructs the network interface 202 to notify all apparatuses connected to the LAN 110 that the MFP 101 is switched into the power saving state and the MFP 103 is proxy for the MFP 101.

Figure 12:
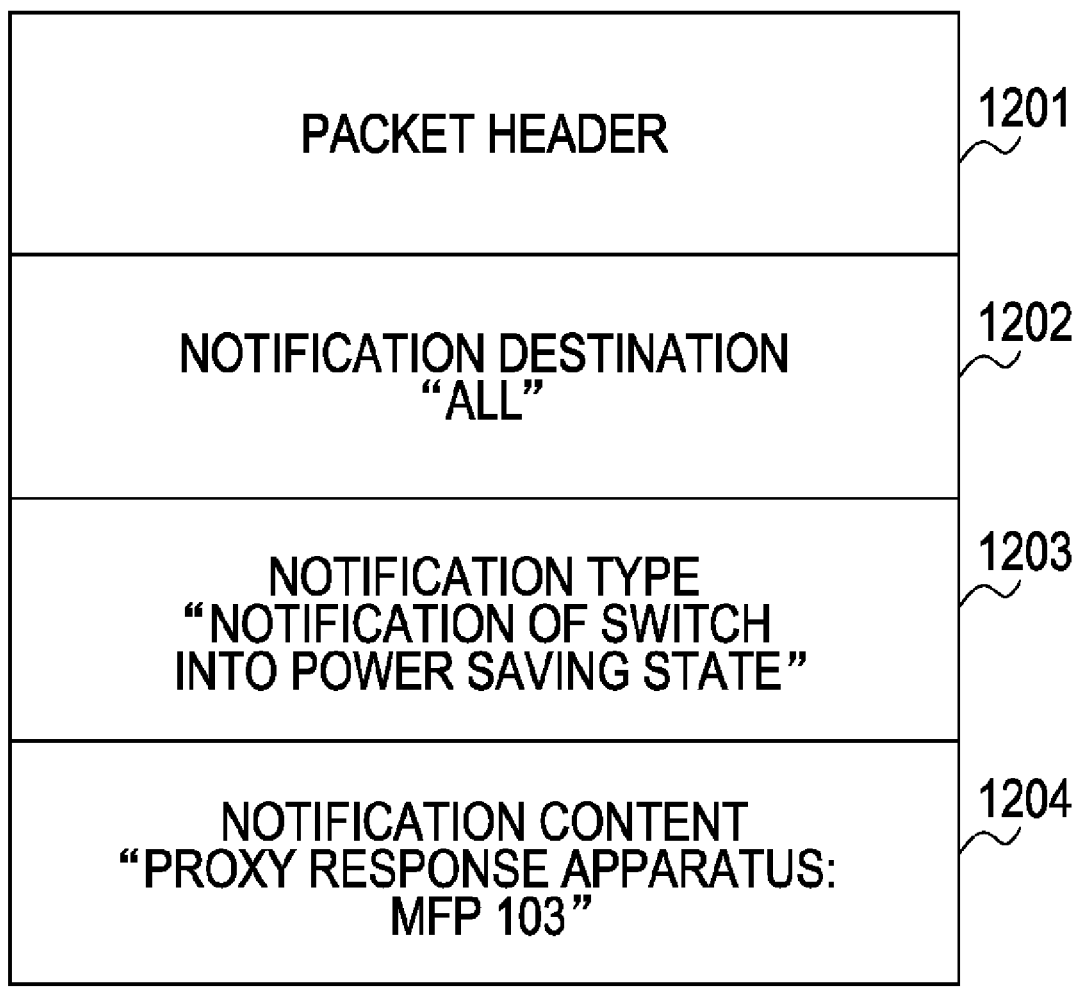
FIG. 12 is a diagram illustrating a switch-to-power-saving-state notification packet transmitted from the MFP 101 to all apparatuses connected to a LAN 110.

FIG. 12 illustrates a switch-to-power-saving-state notification packet that is sent from the MFP 101 to all apparatuses connected to the LAN 110. In the switch-to-power-saving-state notification packet, data (ALL) described in a notification destination description field 1202 following a packet header 1201 indicates that the packet is addressed to all apparatuses. Data described in a notification type description field 1203 indicates that the packet is a notification of the switch into the power saving state. In a notification content field 1204, data is described to indicate that the MFP 103 is to operate as a proxy response apparatus.

Figure 9:
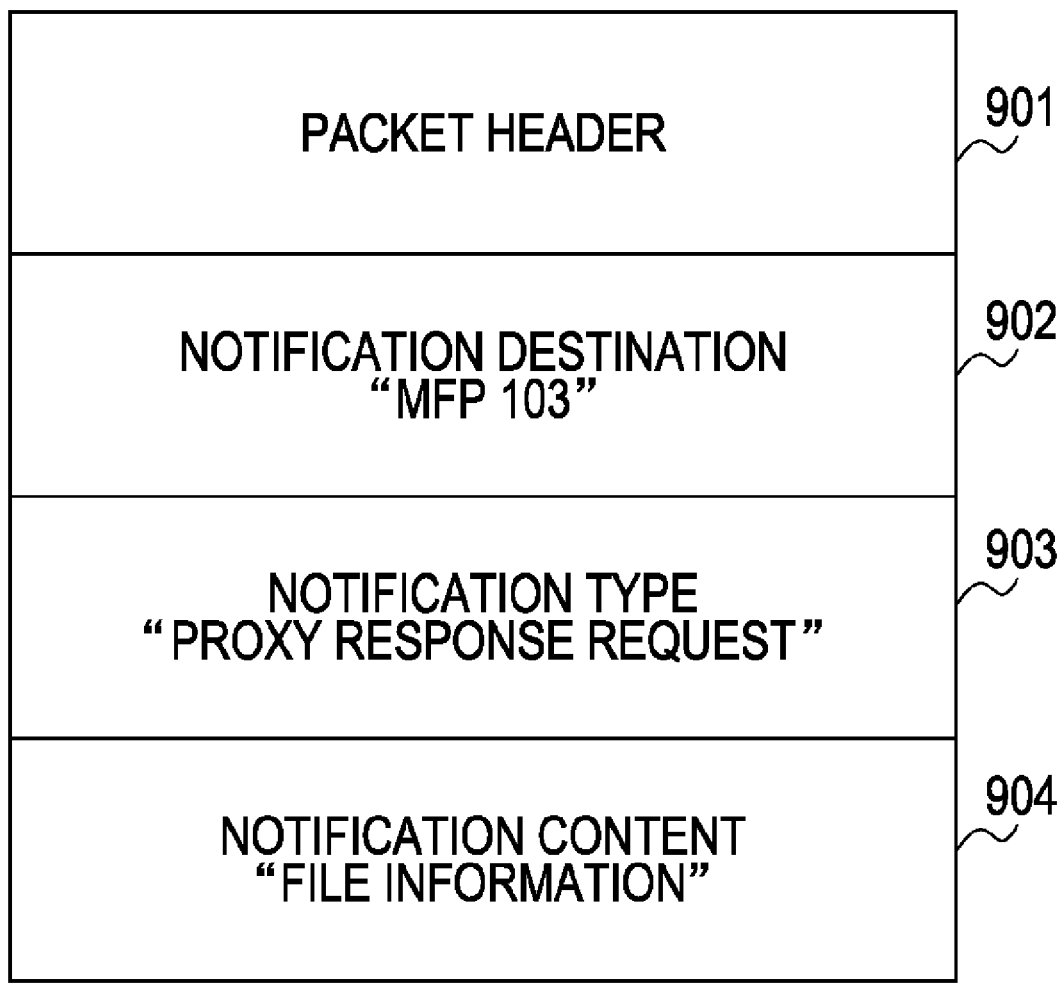
FIG. 9 is a diagram illustrating an example of a proxy response request packet transmitted from the MFP 101 to the MFP 103.

In step S803, the CPU 201 generates a proxy response request packet including information indicating what request the MFP 103 should respond to by proxy, and the CPU 201 instructs the network interface 202 to transmit the generated proxy response request packet to the MFP 103. FIG. 9 illustrates an example of a proxy response request packet transmitted from the MFP 101 to the MFP 103. In the proxy response request packet, data is described in a notification destination description field 902 to indicate that the MFP 103 is specified as a notification destination. In a notification type description field 903, data is described to indicate that the notification type is a proxy response request. In a notification content field 904, the file information (FIG. 7A) stored in the storage area A 401 of the hard disk 211 of the MFP 101 is described. Note that the network interface 202 of the MFP 101 functions as a third transmitting unit that transmits the file information to the MFP 103, and the network interface 202 of the MFP 103 functions as a first receiving unit that receives the file information from the MFP 101.

In step S804, the CPU 201 transmits a switching signal to the voltage control circuit 231 via the control signal line 234 to switch the MFP 101 into the power saving state. Upon receiving the switching signal from the CPU 201, the voltage control circuit 231 cuts off the voltage supply via the sub power supply line 233. Thus, via the process described above, the MFP 101 switches the operation state from the normal power state into the power saving state.

Figure 10:
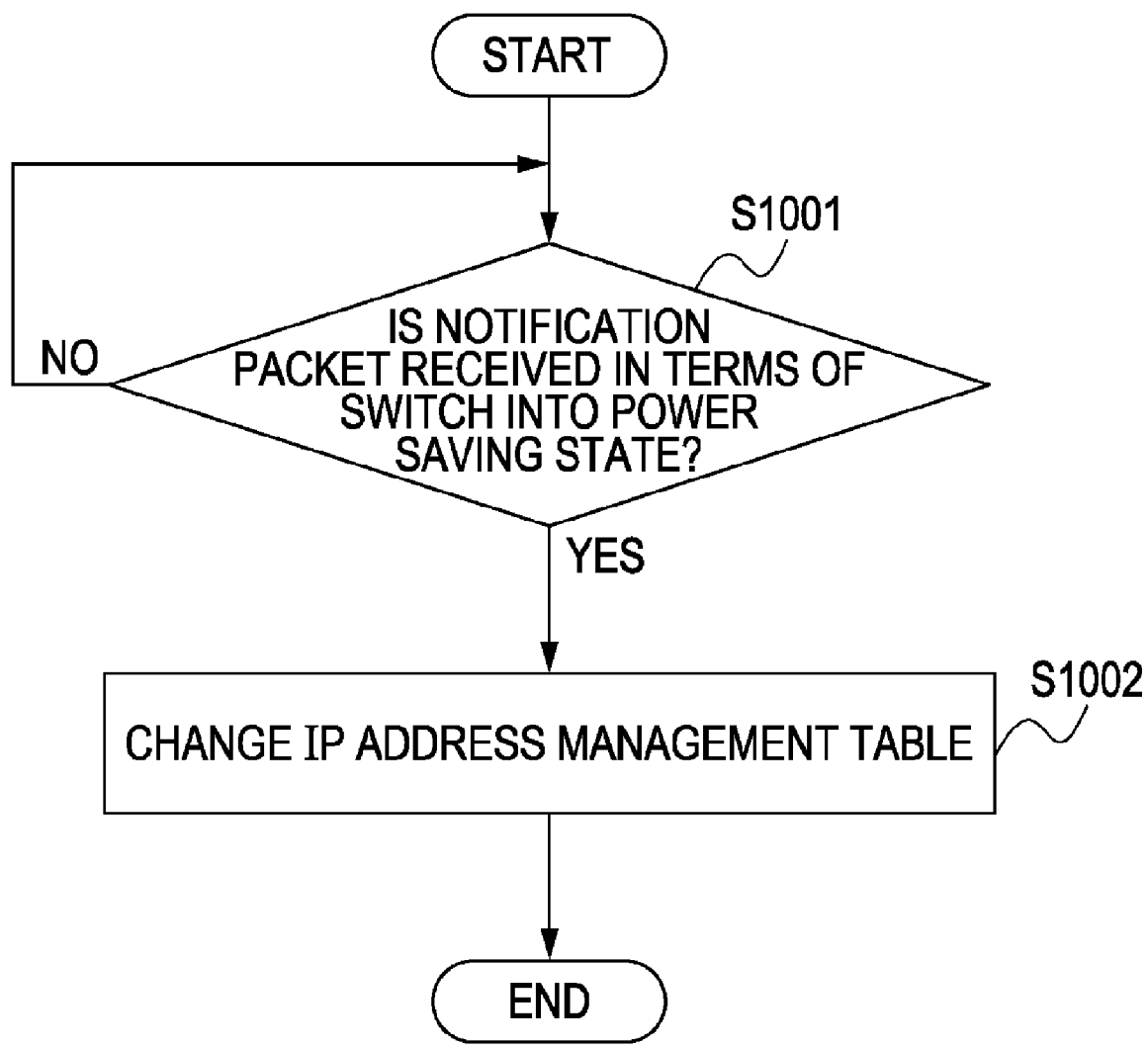
FIG. 10 is a flow chart illustrating a process performed by a PC 100, the MFP 102, and the MFP 103 in response to receiving a switch-to-power-saving-state notification packet from the MFP 101.

Next, referring to a flow chart shown in FIG. 10, an explanation is given below as to a process performed by the PC 100, the MFP 102, and the MFP 103 in response to receiving the switch-to-power-saving-state notification packet from the MFP 101. In the following explanation, by way of example, it is assumed that the process shown in FIG. 10 is performed by the MFP 102. Note that the PC 100 and the MFP 103 can perform a similar process. Steps in FIG. 10 are executed by the CPU 201 of the MFP 102. In the execution of these steps, the CPU 201 loads a control program into the RAM 206 from the hard disk 211 or the ROM 205 and executes it.

In step S1001, the CPU 201 of the MFP 102 determines whether a switch-to-power-saving-state notification packet is received from another MFP. If it is determined that a switch-to-power-saving-state notification packet has been received, the CPU 201 advances the process to step S1002.

In step S1002, the CPU 201 changes the IP address of the MFP 101, which is the sender of the received switch-to-power-saving-state notification packet, to the IP address of the MFP 103 that is to be responsible for proxy response. FIG. 18 illustrates an IP address management table managed by the MFP 102 that has received the switch-to-power-saving-state notification packet. When the CPU 201 of the MFP 102 receives the switch-to-power-saving-state notification packet from the MFP 101, the CPU 201 rewrites an IP address described in a field 1801 such that the destination IP address of the MFP 101 is changed to the IP address of the MFP 103.

Figure 13:
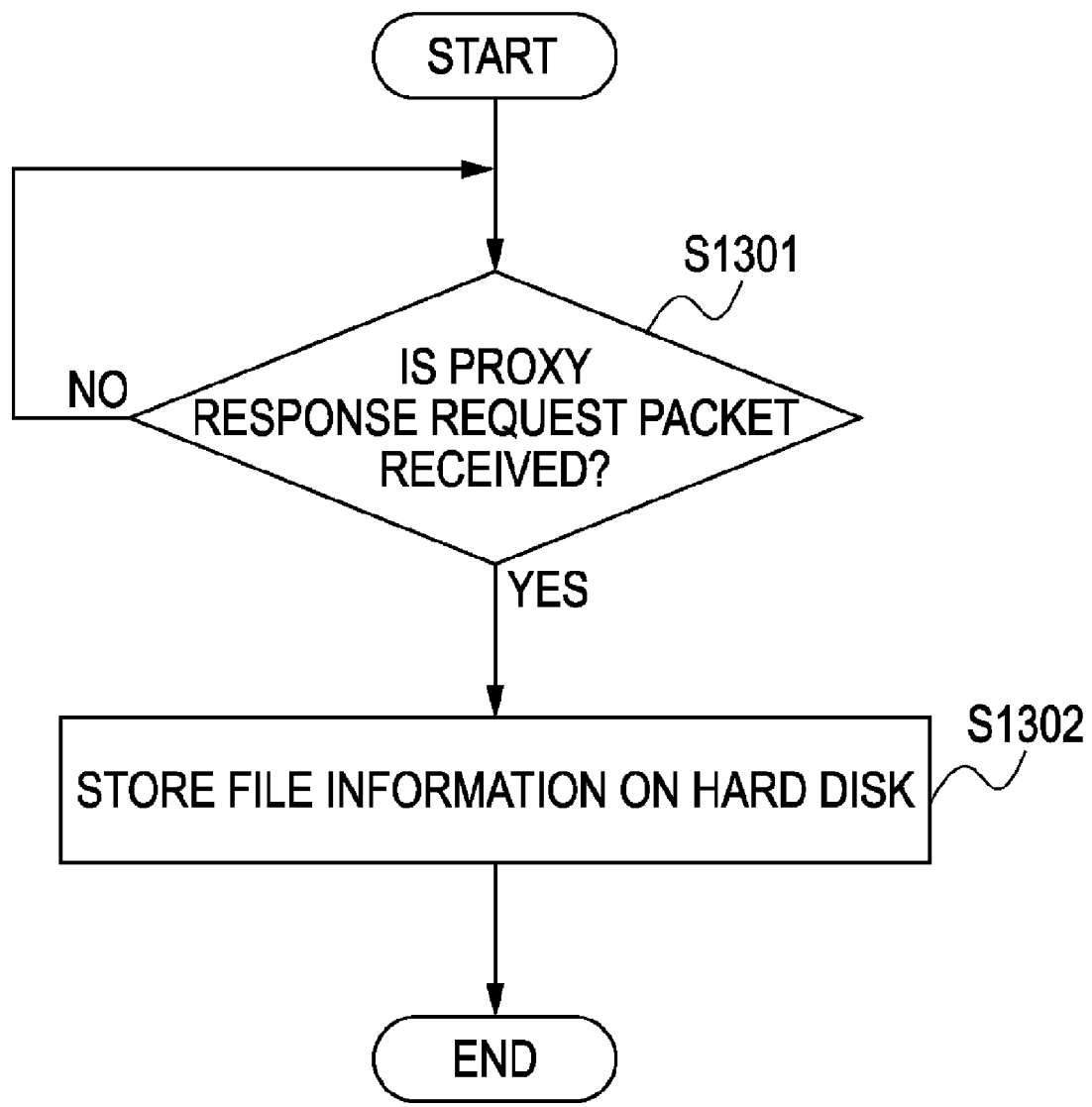
FIG. 13 is a flow chart illustrating a process performed by the MFP 103 in response to receiving a proxy response request packet from the MFP 101.

Next, referring to a flow chart shown in FIG. 13, an explanation is given below as to a process performed by the MFP 103 when the MFP 103 receives the proxy response request packet from the MFP 101. Steps in FIG. 13 are executed by the CPU 201 of the MFP 103. In the execution of these steps, the CPU 201 loads a control program into the RAM 206 from the hard disk 211 or the ROM 205 and executes it.

In step S1301, the CPU 201 of the MFP 103 determines whether a proxy response request packet is received. If it is determined that a proxy response request packet has been received, the CPU 201 advances the process to step S1302.

In step S1302, the CPU 201 stores, in the hard disk 211, the file information of the MFP 101 described in the notification content field 904 of the proxy response request packet.

Figure 14:
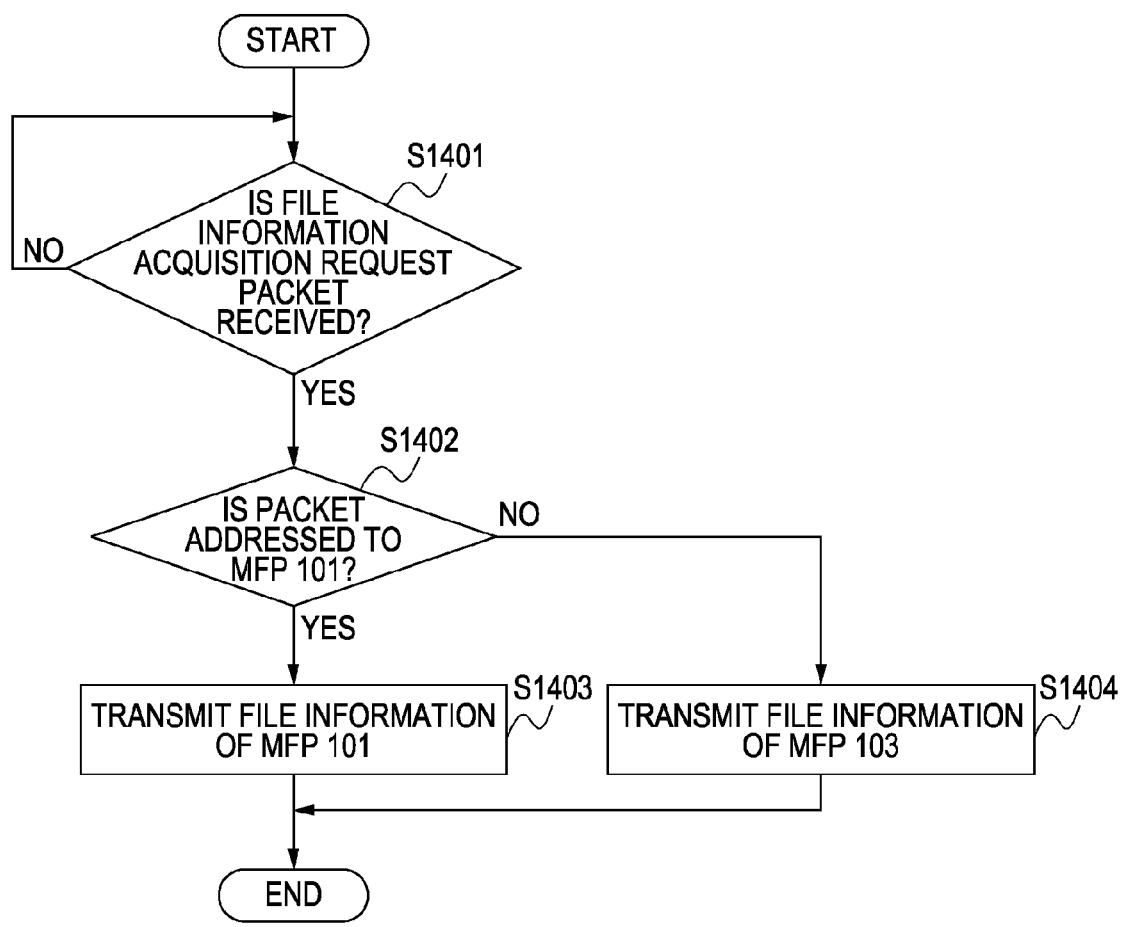
FIG. 14 is a flow chart illustrating a process that is performed by the MFP 103 being in proxy response operation for the MFP 101 when the MFP 103 receives a file information acquisition request packet from the MFP 102.

Next, with reference to a flow chart shown in FIG. 14, an explanation is given below as to a process that is performed by the MFP 103, which is in operation of proxy response for the MFP 101, when the MFP 103 receives a file information acquisition request packet from the MFP 102. Steps in FIG. 14 are executed by the CPU 201 of the MFP 103. In the execution of these steps, the CPU 201 loads a control program into the RAM 206 from the hard disk 211 or the ROM 205 and executes it.

In step S1401, the CPU 201 of the MFP 103 determines whether a file information acquisition request packet is received from the MFP 102. If it is determined that a file information acquisition request packet has been received, the CPU 201 advances the process to step S1402. Note that the network interface 202 functions as a second receiving unit that receives the file information acquisition request.

In step S1402, the CPU 201 determines whether the received file information acquisition request packet is originally addressed to the MFP 101. If so, the CPU 201 advances the process to step S1403. On the other hand, if the received file information acquisition request packet is addressed to the MFP 103, the CPU 201 advances the process to step S1404.

The CPU 201 performs the above determination based on the data described in the notification destination description field 502 of the network packet. In the present example according to the first embodiment, the MFP 102 has already received the switch-to-power-saving-state notification packet from the MFP 101. Therefore, even when data indicating the MFP 101 as the notification destination is described in the notification destination description field 502 in the generated file information acquisition request packet, the packet is transmitted to the MFP 103. Thus, in the first embodiment, the file information request packet shown in FIG. 5 is transmitted from the MFP 102 to the MFP 103. As a result, the CPU 201 of the MFP 103 makes an affirmative determination in step S1402.

In step S1403, because the received file information acquisition request packet is originally addressed to the MFP 101, the CPU 201 transmits the file information of the MFP 101 stored in step S1302 (FIG. 13) in the hard disk 211 to the MFP 102. Herein, the network interface 202 functions as the first transmitting unit that transmits the file information.

In step S1404, because the received file information acquisition request packet is addressed to the MFP 103, the CPU 201 transmits the file information of the MFP 103 stored in the hard disk 211 to the MFP 102.

Figure 15:
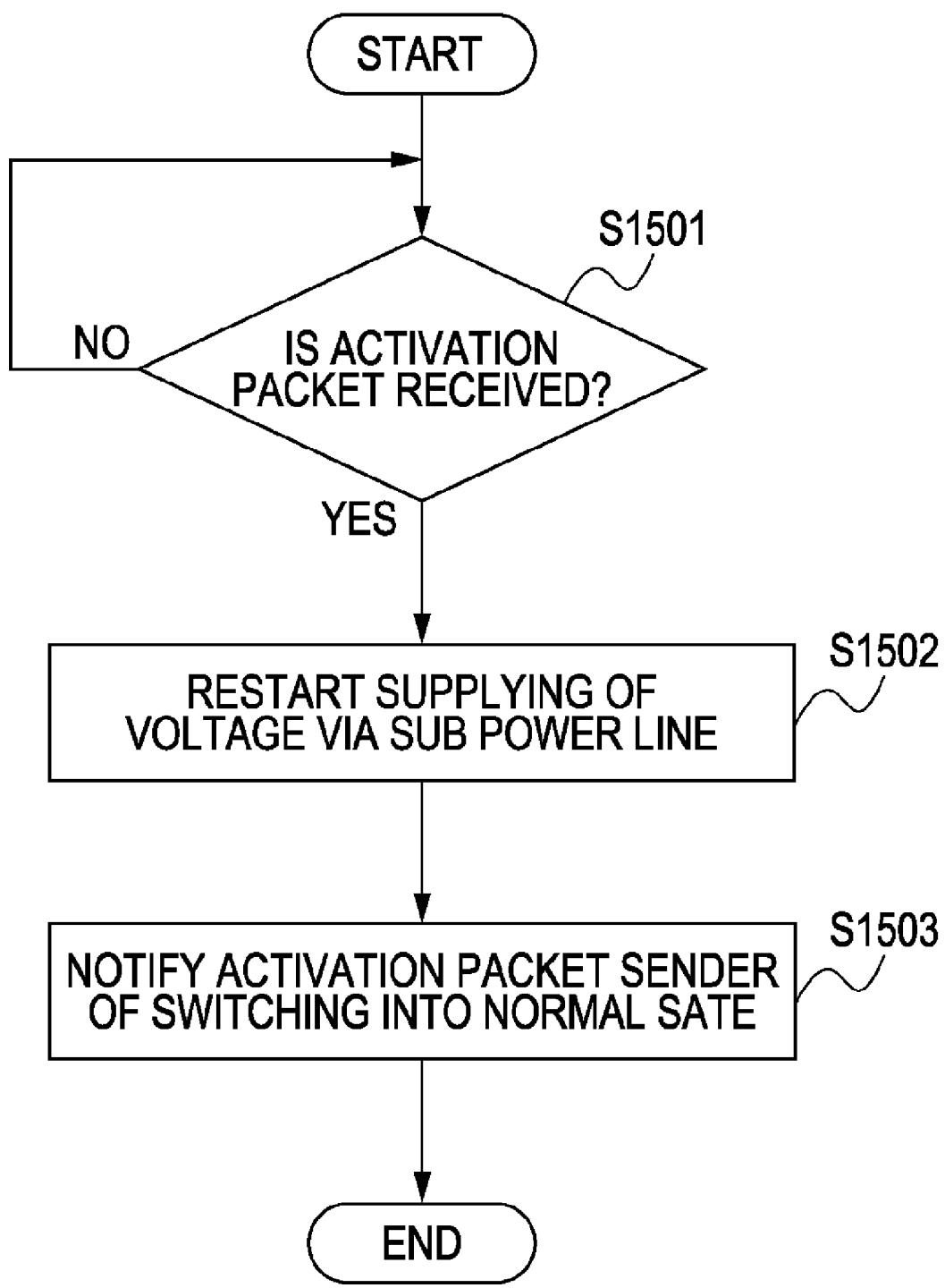
FIG. 15 is a flow chart illustrating a process of switching the MFP 101 operating in the power saving state into the normal power state.

Next, with reference to a flow chart shown in FIG. 15, an explanation is given below as to a process of switching the MFP 101 operating in the power saving state into the normal power state. Steps in FIG. 15 are executed by the CPU 201 of the MFP 101. In the execution of these steps, the CPU 201 loads a control program into the RAM 206 from the hard disk 211 or the ROM 205 and executes it.

In step S1501, the CPU 201 of the MFP 101 determines whether the network interface 202 receives an activation packet (see FIG. 3). If it is determined that an activation packet has been received, the CPU 201 advances the process to step S1502. In a case where a packet other than an activation packet is received, the CPU 201 discards the received packet and does not perform any response. Thus, when the network interface 202 receives a file information acquisition request packet, a file data acquisition request packet, or the like, the CPU 201 of the MFP 101 maintains the power saving state. The MFP 101 switches into the normal power state in response to a packet received via the network interface 202 only when the received packet is an activation packet.

In step S1502, the CPU 201 transmits a switching signal for switching the power state from the power saving state to the normal power state to the voltage control circuit 231 via the control signal line 234. Upon receiving the switching signal from the CPU 201, the voltage control circuit 231 restarts the supplying of the voltage to the respective parts connected via the sub power supply line 233 thereby switching the power state of the MFP 101 into the normal power state.

In step S1503, the CPU 201 refers to the sender address field 302 of the activation packet and instructs the network interface 202 to notify the sender of the activation packet that the MFP 101 has been switched into the normal power state.

Figure 16:
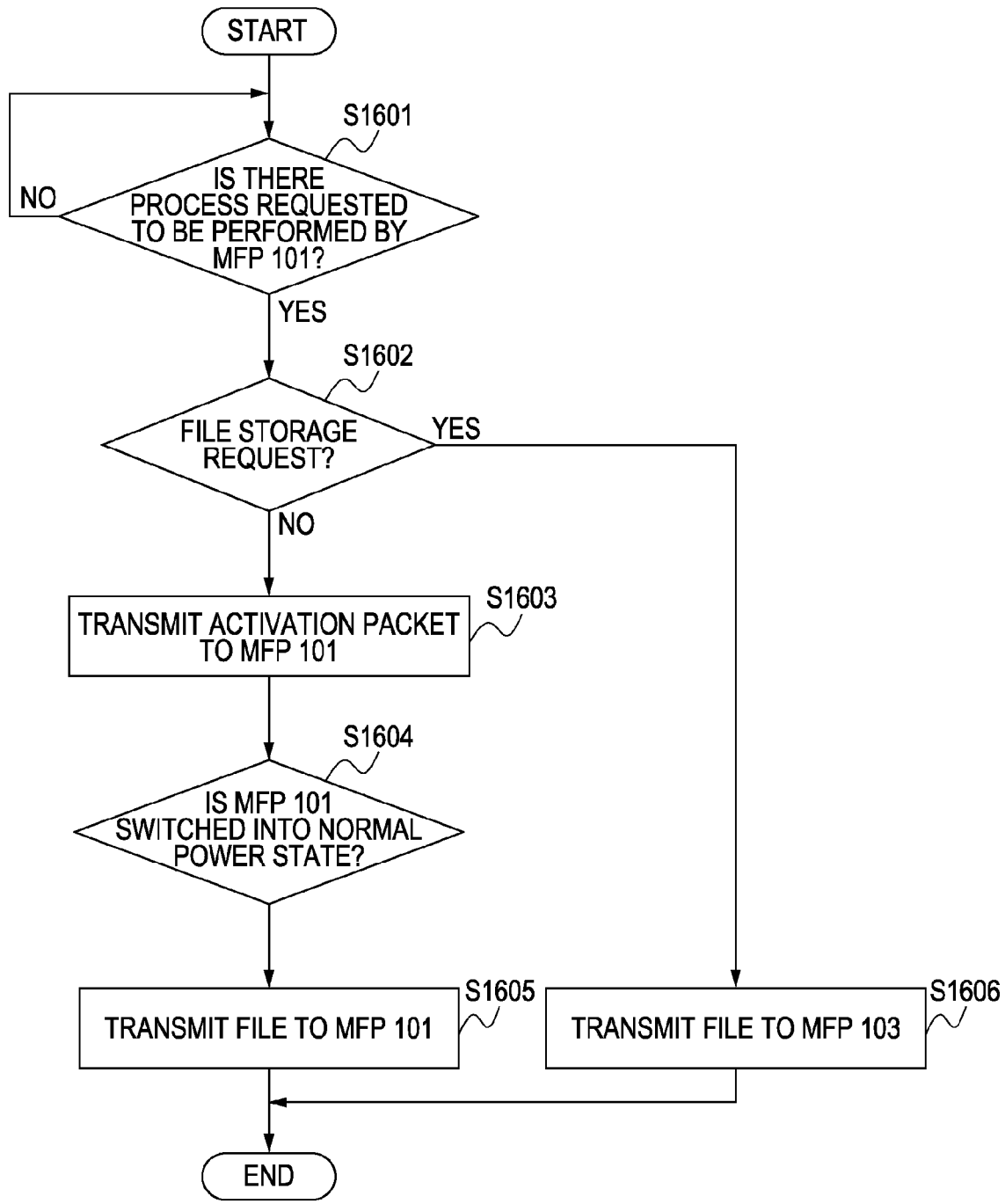
FIG. 16 is a flow chart illustrating a process performed by the MFP 102 in response to a request issued by a user of the MFP 102 to store a file in the MFP 101 being in the power saving state.

Next, with reference to a flow chart shown in FIG. 16, an explanation is given below as to a process performed by the MFP 102 in response to a request issued by a user of the MFP 102 to store a file in the MFP 101 being in operation in the power saving state. Steps in FIG. 16 are executed by the CPU 201 of the MFP 102. In the execution of these steps, the CPU 201 loads a control program into the RAM 206 from the hard disk 211 or the ROM 205 and executes it.

In step S1601, the CPU 201 of the MFP 102 determines whether a process request addressed to the MFP 101 is issued by a user of the MFP 102 via the operation unit 220. In a case where the CPU 201 determines that a process request addressed to the MFP 101 has been issued, the CPU 201 advances the process to step S1602.

In step S1602, the CPU 201 determines whether the process specified by the user of the MFP 102 is a file storage request. If it is determined that the request is a file storage request, the CPU 201 advances the process to step S606. The file storage request refers to a request to store a file on the hard disk 211 of the MFP 101. Note that the file storage request is different from a request to print a file by the MFP 101. The file storage request includes information indicating which one of a plurality of files stored on the hard disk 211 of the MFP 102 is to be processed (for example, a file ID=we92agsb9o shown in FIG. 7 is specified). In a case where the request is to print a file by the MFP 101, it is necessary to switch the MFP 101 being in the power saving state into the normal power state, and thus the determination in step S1602 is negative.

In step S1603, to switch the MFP 101 from the power saving state to the normal power state, the CPU 201 instructs the network interface 202 to transmit an activation packet to the MFP 101. Note that as described above, because the MFP 102 has received the switch-to-power-saving-state notification packet from the MFP 101, the IP address management table has been changed as shown in FIG. 18. Thus, the network interface 202 transmits an activation packet to the MFP 103.

In step S1604, the CPU 201 monitors whether the network interface 202 receives from the MFP 101 a message notifying that the MFP 101 has returned into the normal power state thereby determining whether the MFP 101 has come into the normal power state. If it is determined that the network interface 202 has received a notification from the MFP 101 that the MFP 101 has returned into the normal power state, the CPU 201 advances the process to step S1605. When the MFP 102 receives the notification from the MFP 101 that the MFP 101 has returned into the normal power state, the MFP 102 changes the IP address management table 1100 from that shown in FIG. 18 to that shown in FIG. 11.

In step S1605, the CPU 201 instructs the network interface 202 to transmit a file (for example, a file with a file ID=we92agsb9o shown in FIG. 7) specified by the file print request to the MFP 101 that has returned into the normal power state.

Figure 19:
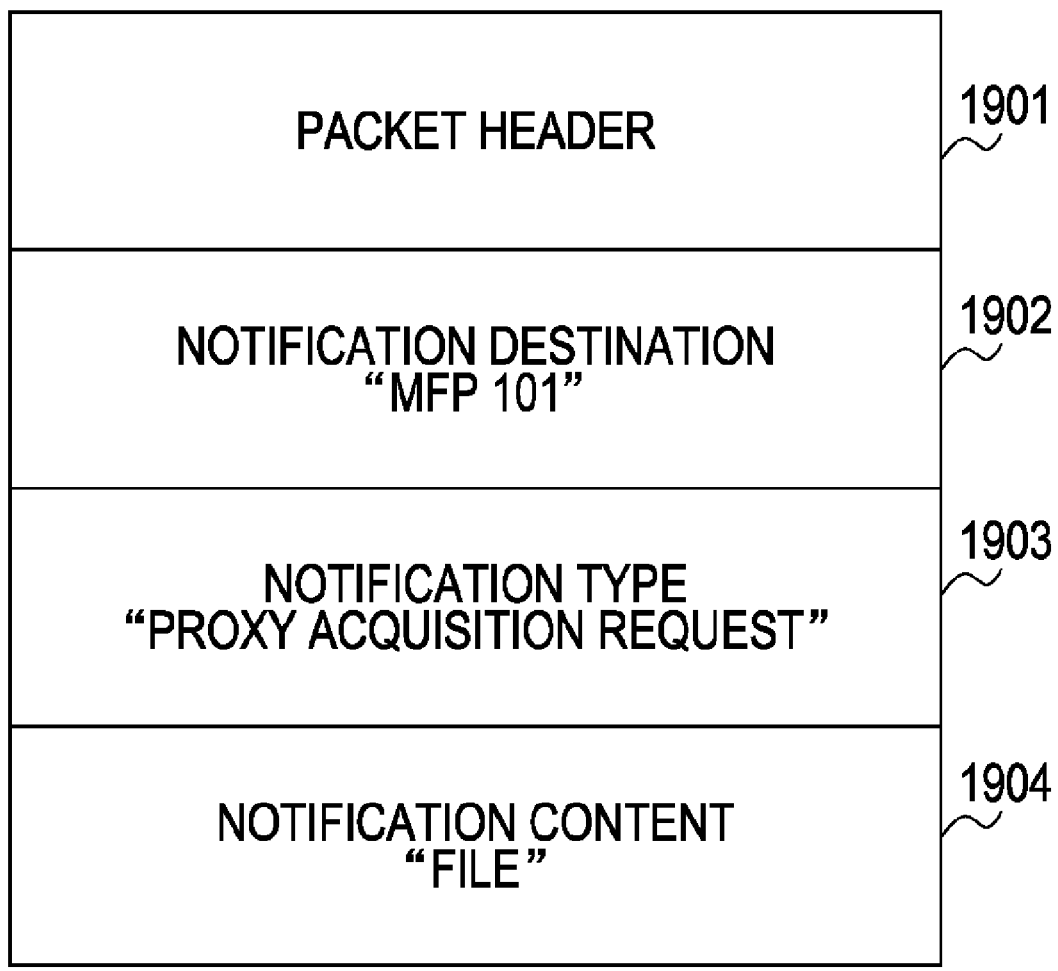
FIG. 19 is a flow chart illustrating a process that is performed by the MFP 103 when the MFP 103 receives a proxy acquisition request packet from the MFP 102.

In step S1606, the CPU 201 instructs the network interface 202 to transmit a file (for example, a file with a file ID=we92agsb9o shown in FIG. 7) specified by the file storage request to the MFP 103. The reason why the file is transmitted in step S1606 to the MFP 103 although the file storage request is addressed to the MFP 101 is to maintain the MFP 101 in the power saving state. That is, the file from the MFP 102 is transmitted to the MFP 103 being in proxy operation for the MFP 101, and thus the MFP 101 is maintained in the power saving state without returning from the power saving state. The transmission of the file from the MFP 102 to the MFP 103 is accomplished by transmitting a proxy acquisition request packet such as that shown in FIG. 19. In the proxy acquisition request packet shown in FIG. 19, data indicating the MFP 101 specified by a user is described as a storage destination in a notification destination description field 1902. Data indicating a proxy acquisition request is described in a notification type description field 1903. In a notification content field 1904, data of a file (a file with a file ID=we92agsb9o) specified by a user is placed.

Next, with reference to a flow chart shown in FIG. 17, an explanation is given below as to a process performed by the MFP 103 when the MFP 103 receives a proxy acquisition request packet from the MFP 102. FIG. 20 illustrates file information of a file whose storage destination is specified as the MFP 101 by a file storage request issued by a user of the MFP 102.

In step S1701, the CPU 201 of the MFP 103 determines whether a proxy acquisition request packet is received from the MFP 102. If it is determined that a proxy acquisition request packet has been received, the CPU 201 advances the process to step S1702. In step S1702, the CPU 201 performs a storage operation such that the file data in the notification content field 1904 of the received proxy acquisition request packet is stored in the storage area B 402 of the hard disk 211.

In step S1703, the CPU 201 updates the file information by adding the file information associated with the file data stored in step S1702 to the file information of the MFP 101 stored in the storage area A 401 of the hard disk 211. In this updating process in step S1703, incorporation of file information is achieved as to the file information associated with the file that has been received from the MFP 102 and that is requested to be stored in the MFP 101. That is, when a file information acquisition request packet in terms of the MFP 101 is received from the PC 100, the updated file information of files acquired by proxy in the MFP 102 is transmitted to the PC 100. FIG. 21 illustrates file information of the MFP 101 stored in the storage area A (401) of the hard disk 211 of the MFP 103. As shown, the file information includes file information of a file (with a file name "1c") acquired by proxy in response to an acquisition request issued by the MFP 102.

Next, with reference to a flow chart shown in FIG. 22, an explanation is given below as to a process performed by the MFP 103 to switch the MFP 101 from the power saving state to the normal power state. Note that it is assumed herein that before the MFP 103 transmits an activation packet to the MFP 101, the MFP 102 has already transmitted to the MFP 103 a proxy acquisition request packet in terms of a file to be stored in the MFP 101.

In step S2201, the CPU 201 of the MFP 103 determines whether the network interface 202 receives an activation packet to activate the MFP 101. If the CPU 201 determines that an activation packet has been received, the CPU 201 advances the process to step S2202. Note that the activation packet to activate the MFP 101 is transmitted, for example, in step S1603 shown in FIG. 16 by the MFP 102.

In step S2202, the CPU 201 instructs the network interface 202 to transmit the activation packet shown in FIG. 3 to the MFP 101. In step S2203, the CPU 201 monitors whether the network interface 202 receives, from the MFP 101, a message notifying that the MFP 101 has returned into the normal power state thereby determining whether the MFP 101 has returned into the normal power state. If it is determined that the network interface 202 has received a notification from the MFP 101 that the MFP 101 has returned into the normal power state, the CPU 201 advances the process to step S2204.

In step S2204, the CPU 201 determines whether a proxy acquisition request packet in terms of the MFP 101 has already been received. If the proxy acquisition request packet has already been received, the CPU 201 advances the process to step S2205, but otherwise the CPU 201 advances the process to step S2206.

In step S2205, the CPU 201 instructs the network interface 202 to transmit the file data stored in the notification content field 1904 of the proxy acquisition request packet that has already been received and the file information associated with that file data to the MFP 101. Herein, the network interface 202 of the MFP 103 functions as a fourth transmitting unit that transmits the file acquired by proxy to the MFP 101, and the network interface 202 of the MFP 101 functions as a fourth receiving unit (fifth receiving unit) that receives a proxy-acquired file from the MFP 103. In the case where the file data transmitted in step S2205 from the MFP 103 is received by the network interface 202, the CPU 201 of the MFP 101 performs a control operation to store the received file data in the storage area B (402) of the hard disk 211 of the MFP 101.

Figure 23:
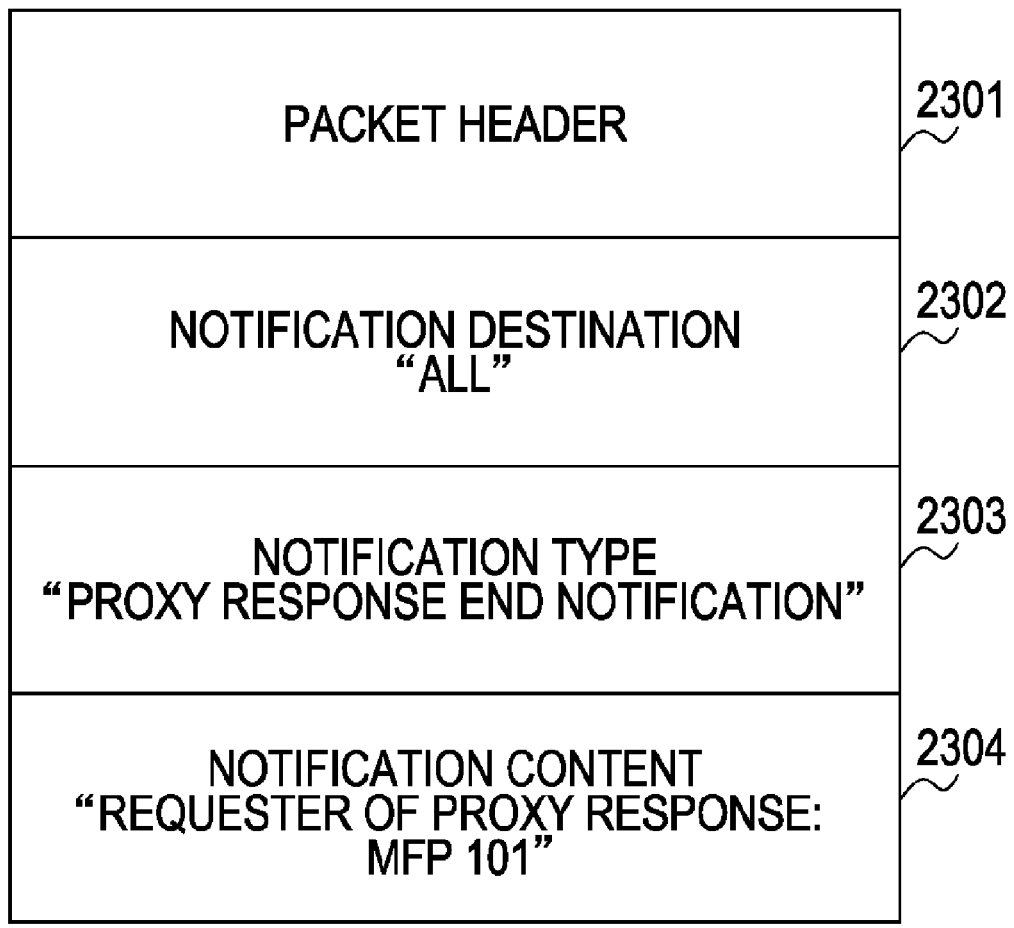
FIG. 23 is a diagram illustrating an example of an end-of-proxy-response notification packet.

In step S2206, the CPU 201 transmits an end-of-proxy-response notification packet to all apparatuses connected to the LAN 110 to notify that the MFP 103 has ended the proxy response process for the MFP 101. FIG. 23 illustrates an example of an end-of-proxy-response notification packet. In the end-of-proxy-response notification packet, data indicating that the notification is to be sent to all apparatuses is described in a notification destination description field 2302. In a notification type description field 2303, data indicating that the proxy response has been ended is described. In a notification content field 2304, data indicating that the MFP 101 is the requester of the proxy response is described.

Upon receiving the end-of-proxy-response notification packet, the MFPs and the PC 100 corrects the IP address management table 1100 which was modified as shown in FIG. 18 in response to the switch-to-power-saving-state notification. More specifically, the IP address 1801 for the MFP 101 is changed from the IP address of the MFP 103 to the IP address 1101 of the MFP 101.

Figure 22:
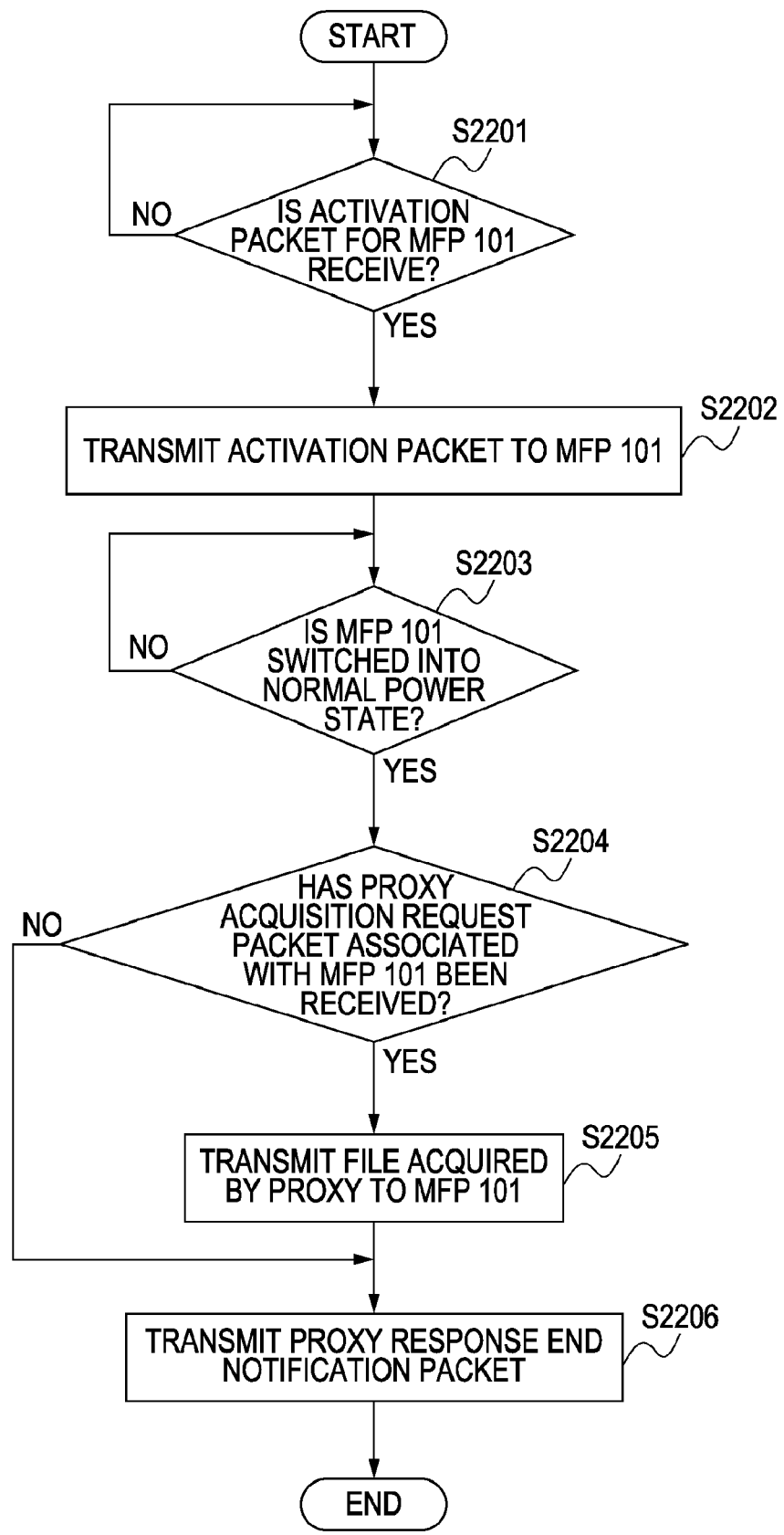
FIG. 22 is a flow chart illustrating a process performed by the MFP 102 to get the MFP 101 to return into the normal power state from the power saving state.

In the flow chart shown in FIG. 22, in response to the transmission of the activation packet from the MFP 103 to the MFP 101, the MFP 101 returns into the normal power state. When the MFP 101 returns into the normal power state due to some other reason, steps S2204 to S2206 may be performed. For example, when a power save cancel key (not shown) disposed on the MFP 101 is pressed, the MFP 101 may notify the power saving state of the MFP 103 has been cancelled. If the MFP 103 determines in S203 that the MFP 101 has returned into the normal power state, the MFP 103 may perform steps S2204 to S2206.

Next, an explanation is given as to a process performed by the MFP 103 when the MFP 103 receives a message from the MFP 102 that requests the MFP 103 to process a file stored in the MFP 101.

Figure 24:
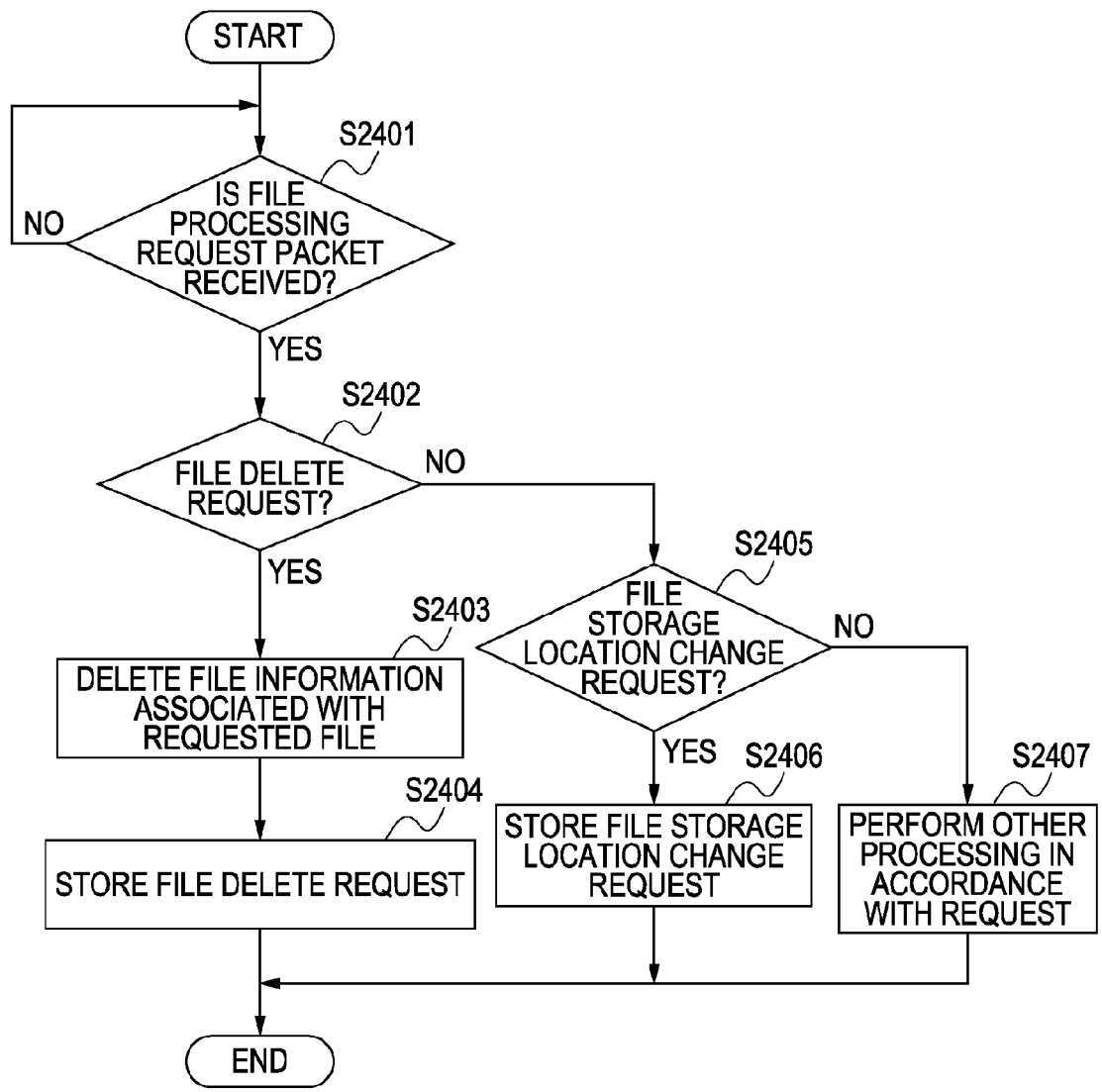
FIG. 24 is a flow chart illustrating a process that is performed by the MFP 103 when the MFP 103 receives, from the MFP 102, a process request on a file stored in the MFP 101.

FIG. 24 is a flow chart illustrating the process performed by the MFP 103 when the MFP 103 receives a message from the MFP 102 that requests the MFP 103 to process a file stored in the MFP 101. Note that the MFP 103 can receive a message from the MFP 102 that requests the MFP 103 to process a file stored in the MFP 101 when the MFP 101 is in the power saving state.

Figure 25:
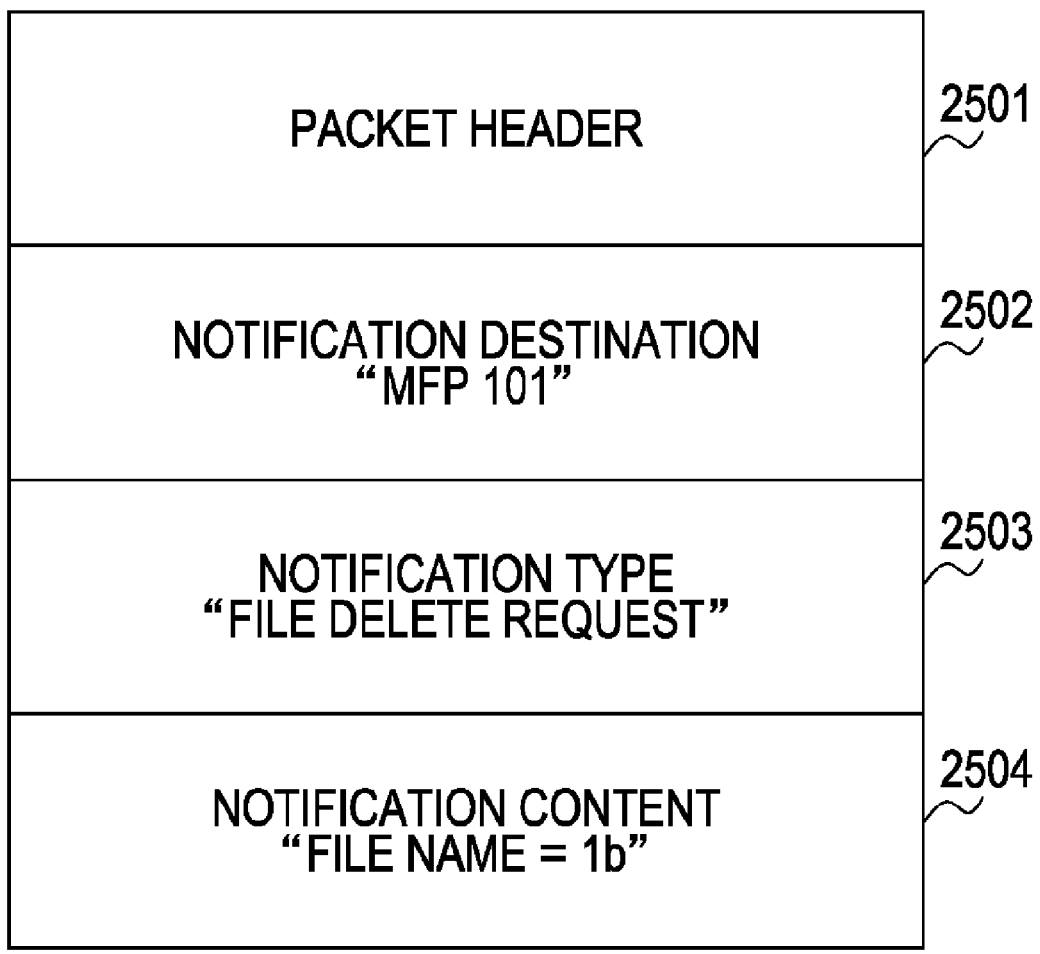
FIG. 25 is a diagram illustrating an example of a file delete request packet.

An example of a process request the MFP 103 receives from the MFP 102 is a file delete request, i.e., a request to delete a file stored in the MFP 101. FIG. 25 illustrates an example of a file delete request packet. In a notification destination description field 2502, data is described to indicate that the MFP 101 is specified as an MFP from which a file specified by a user of the MFP 102 is to be deleted. In a notification type description field 2503, data is described to indicate that the requested process is to delete a file. In a notification content field 2504, data is described to indicate the file name of the file requested by the user to be deleted. Instead of the file name, a file ID may be described. Both the file name and the file ID may be described. In the example shown in FIG. 25, "1b" is described as the file name.

Figure 26:
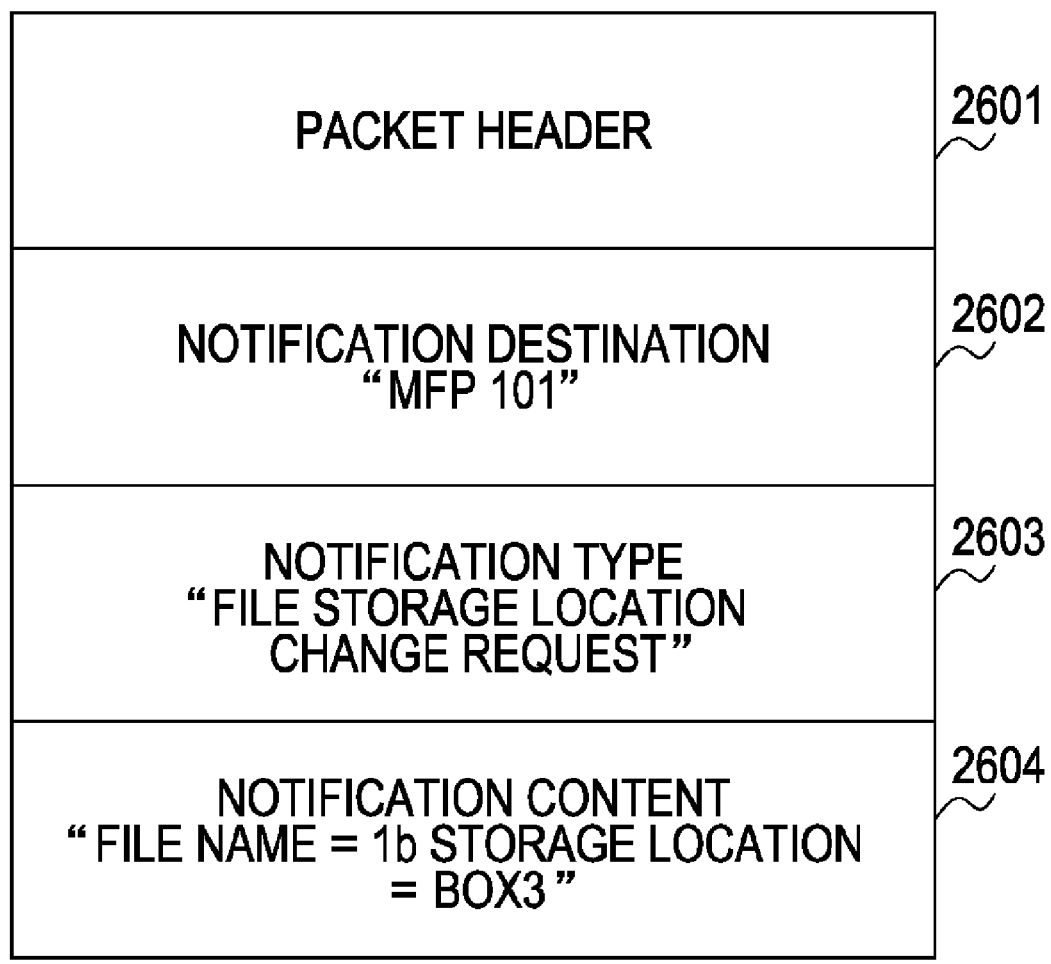
FIG. 26 is a diagram illustrating an example of a file storage location change request packet.

Another example of a process request is a file storage location change request, i.e., a request to change the storage location of a file in the MFP 101. FIG. 26 illustrates an example of a file storage location change request packet. In a notification destination description field 2602, data is described to indicate that the file specified by the user of the MFP 102 to be changed in location is stored in the MFP 102. In a notification type description field 2603, data is described to indicate that the requested process is to change the location in which the file is stored. In a notification content field 2604, data is described to indicate the file name of the file the storage location of which is requested to be changed by the user, and also data is described to indicate the storage location of the file. In the example shown in FIG. 26, "1b" is described as the file name, and "BOX3" is described to indicate the storage location of the file. Herein, BOX refers to a storage area in the storage area B 402 on the hard disk 211 of the MFP 101. When a user of the MFP 101 accesses file data stored on the hard disk 211, the specifying of a box allows the user to access a file linked to the specified BOX. By creating a plurality of storage areas in the storage area B (402) of the hard disk 211 and assigning symbols/numbers such as BOX1, BOX2, BOX3, and so on to the respective created storage areas, it becomes possible to manage a plurality of file data separately. In the example shown in FIG. 26, "BOX3" selected from the plurality of storage areas provided in the storage area B (402) of the MFP 101 is specified as a storage location of the file data with a file name=1b. In the following explanation of the first embodiment, by way of example, it is assumed that the file with file name=1b is stored in the BOX1 in the MFP 101.

Steps in FIG. 24 are executed by the CPU 201 of the MFP 103. In the execution of these steps, the CPU 201 loads a control program into the RAM 206 from the hard disk 211 or the ROM 205 and executes it.

In step S2401, the CPU 201 of the MFP 103 determines whether a file process request packet is received from the MFP 102. If it is determined that a file process request packet has been received, the CPU 201 advances the process to step S2402. Herein, the network interface 202 of the MFP 103 functions as a third receiving unit that receives a process request on a file stored in the MFP 101.

In step S2402, the CPU 201 determines whether the file process request specified by the file process request packet is the file delete request shown in FIG. 25. If it is determined that the request is the file delete request, the CPU 201 advances the process to step S2403.

In step S2403, the CPU 201 deletes the file information associated with the file specified to be deleted from the file information of the MFP 101. In the first embodiment, the file information received from the MFP 101 includes file information associated with two files with file name=1a and file name=1b as shown in FIG. 7, while the file delete request shown in FIG. 25 specifies the file with file name=1b as a file to be deleted. Thus, the CPU 201 deletes the file information associated with the file with file name 1b from the file information received from the MFP 101.

In step S2404, because the MFP 101 is in the power saving state, the CPU 201 stores the file delete request packet in the RAM 206 so that the file delete request packet can be transmitted to the MFP 101 when the MFP 101 returns into the normal power state.

In step S2405, the CPU 201 determines whether the file process request specified by the file process request packet is the file storage location change request shown in FIG. 26. If it is determined that the file process request is the file storage location change request, the CPU 201 advances the process to step S2406.

In step S2406, because the MFP 101 is in the power saving state, the CPU 201 stores the file storage location change request packet in the RAM 206 so that the file storage location change request packet can be transmitted to the MFP 101 when the MFP 101 returns into the normal power state.

In step S2407, the CPU 201 determines that the file process request stored in the MFP 101 is neither the file delete request nor the file storage location change request but another process request, and CPU 201 performs a process according to the process request. An example of the process request is a request to change a file name. In a case where it is determined that the process request is a request to change a file name, a change is performed as to the file name of a file requested to be changed but the file information of the other files stored in the MFP 101 is maintained unchanged.

Figure 27:
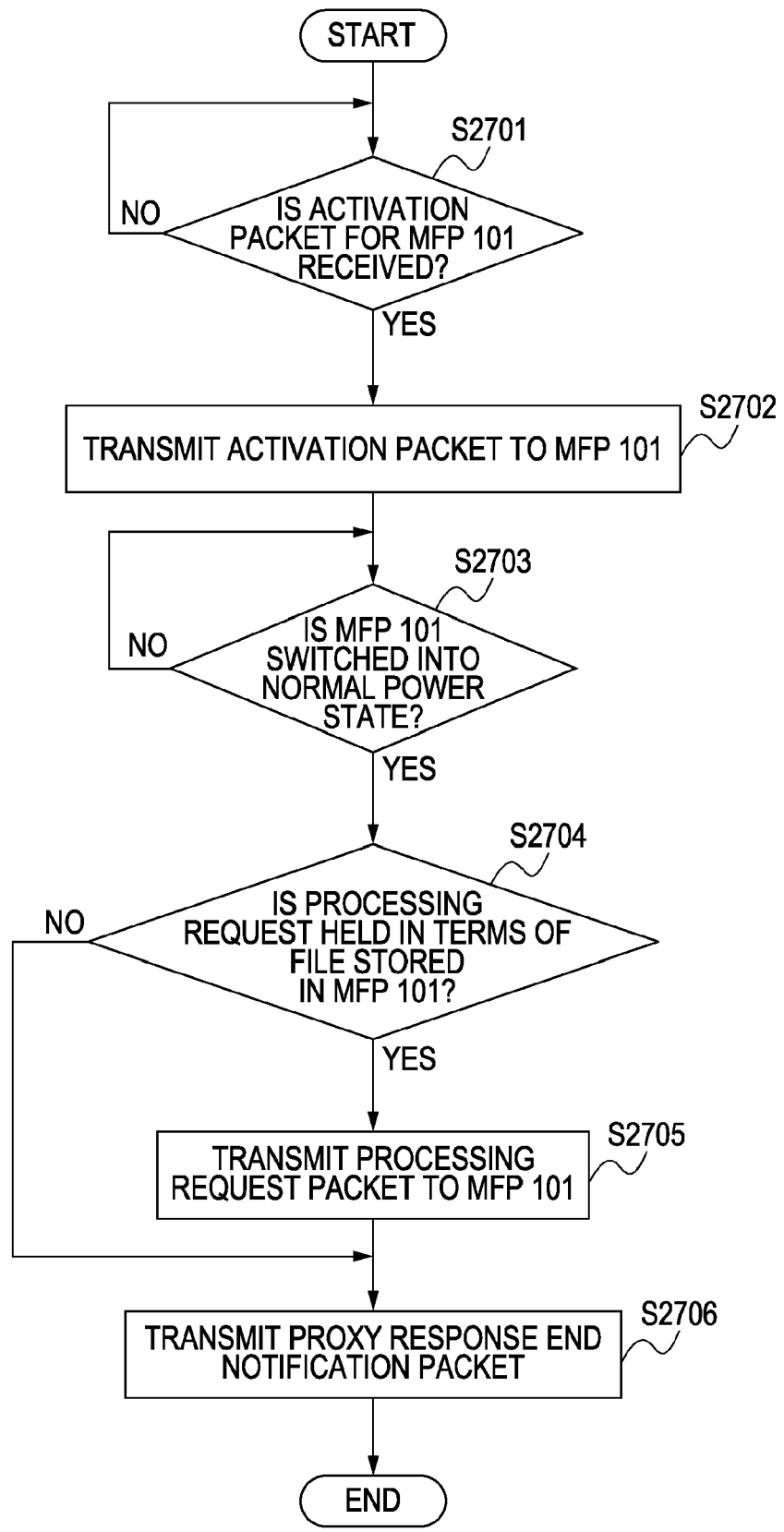
FIG. 27 is a flow chart illustrating a process performed by the MFP 103 to get the MFP 101 to return into the normal power state from the power saving state.

Next, with reference to a flow chart shown in FIG. 27, an explanation is given as to a process performed by the MFP 103 to return the MFP 101 into the normal power state from the power saving state.

Note that it is assumed that before the MFP 103 transmits an activation packet to the MFP 101, a process request on a file stored in the MFP 101 has already been transmitted from the MFP 102 to the MFP 103.

In step S2701, the CPU 201 of the MFP 103 determines whether the network interface 202 receives an activation packet to activate the MFP 101. If it is determined that an activation packet has been received, the CPU 201 advances the process to step S2702. Note that the activation packet to activate the MFP 101 is transmitted, for example, in step S1603 shown in FIG. 16, from the MFP 102.

In step S2702, the CPU 201 instructs the network interface 202 to transmit the activation packet shown in FIG. 3 to activate the MFP 101.

In step S2703, the CPU 201 monitors whether the network interface 202 receives a notification from the MFP 101 that the MFP 101 has returned into the normal power state thereby determining whether the MFP 101 has returned into the normal power state. If it is determined that the network interface 202 has received a notification from the MFP 101 that the MFP 101 has returned into the normal power state, the CPU 201 advances the process to step S2704.

In step S2704, the CPU 201 determines whether the process request packet on the file stored in the MFP 101 has already been received and stored in the RAM 206. If so the CPU 201 advances the process to step S2705, but otherwise the CPU 201 advances the process to step S2706.

In step S2705, the CPU 201 transmits the file process request packet stored in the RAM 206 to the MFP 101. Herein, the network interface 202 of the MFP 103 functions as a second transmitting unit that transmits the file process request packet to the MFP 101, while the network interface 202 of the MFP 101 functions as a fourth receiving unit that receives the file process request packet from the MFP 103.

In step S2706, the CPU 201 transmits an end-of-proxy-response notification packet (such as that shown in FIG. 23) to all apparatuses connected to the LAN 110 to notify that the MFP 103 has ended the proxy response process for the MFP 101.

Upon receiving the end-of-proxy-response notification packet, the MFPs and the PC 100 corrects the IP address management table 1100 which was modified as shown in FIG. 18 in response to the switch-to-power-saving-state notification. More specifically, the IP address 1801 for the MFP 101 is changed from the IP address of the MFP 103 to the IP address 1101 of the MFP 101.

Figure 28:
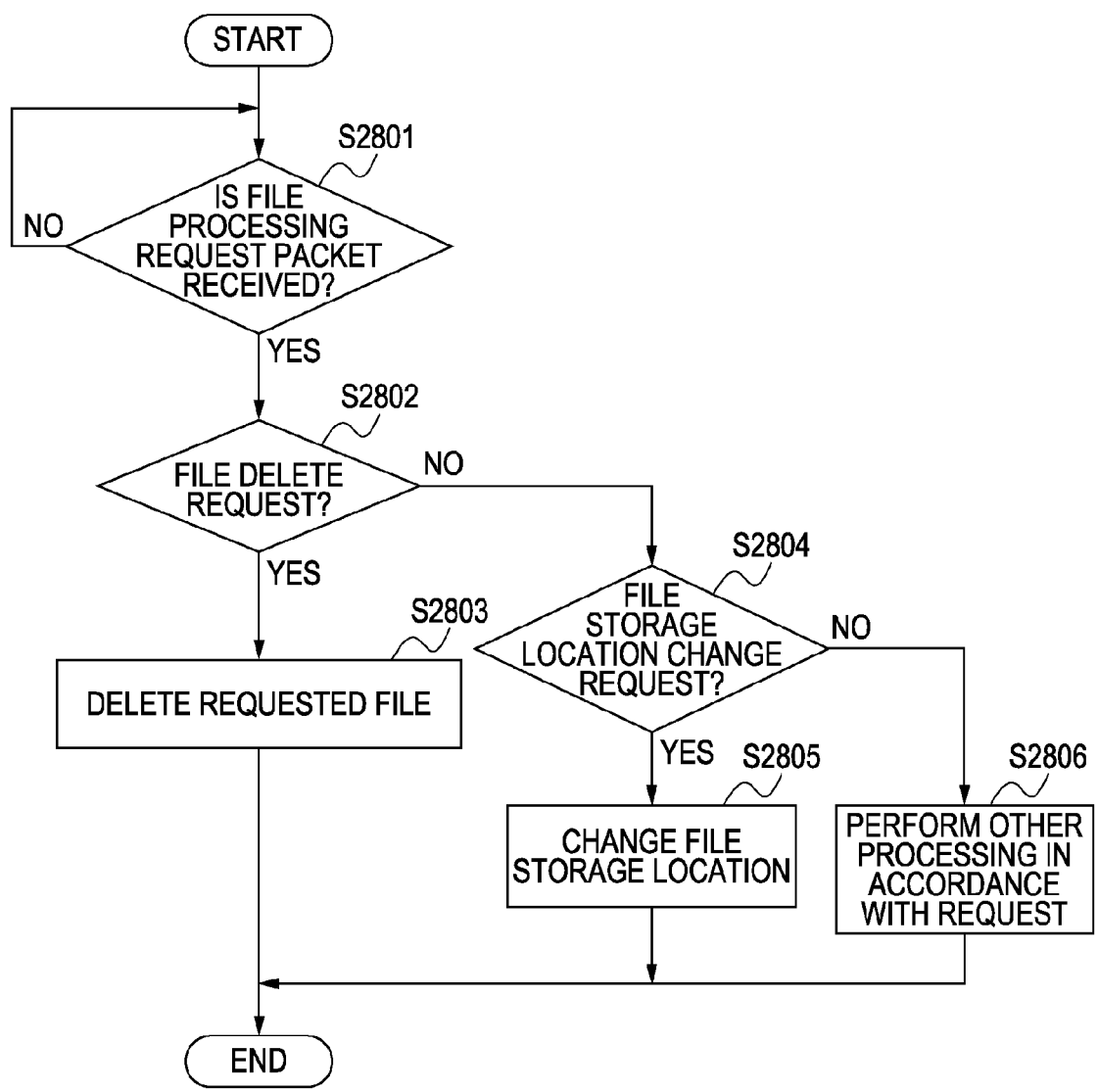
FIG. 28 is a flow chart illustrating a process performed by the MFP 101 when the MFP 101 receives a file process request packet from the MFP 103 after the MFP 101 returns into the normal power state from the power saving state.

Next, with reference to FIG. 8, an explanation is given as to a process performed by the MFP 101 when the MFP 101 receives a file process request packet from the MFP 103 after the MFP 101 returns into the normal power state from the power saving state. Steps in FIG. 28 are executed by the CPU 201 of the MFP 101. In the execution of these steps, the CPU 201 loads a control program into the RAM 206 from the hard disk 211 or the ROM 205 and executes it.

In step S2801, the CPU 201 of the MFP 101 determines whether the network interface 202 receives a file process request packet from the MFP 103. If it is determined that a file process request packet has been received, the CPU 201 advances the process to step S2802.

In step S2802, the CPU 201 determines whether the file process request specified by the file process request packet is the file delete request shown in FIG. 25. If it is determined that the request is the file delete request, the CPU 201 advances the process to step S2803.

In step S2803, the CPU 201 deletes the specified file from the storage area B 402 of the hard disk 211. In the present example according to the first embodiment, in the file delete request shown in FIG. 25, it is specified to delete the file with file name=1b. Thus, the CPU 201 deletes the file data corresponding to file name=1b from the storage area B 402 of the hard disk 211.

In step S2804, the CPU 201 determines whether the file process request specified by the file process request packet is the file storage location change request shown in FIG. 26. If it is determined that the file process request is the file storage location change request, the CPU 201 advances the process to step S2805.

In step S2805, the CPU 201 performs a control operation such that the storage location is changed for the file specified by the file storage location change request.

In the present example according to the first embodiment, it is assumed by way of example that the file with file name=1b is stored in BOX1 in the MFP 101. Thus, in response to receiving the file storage location change request packet shown in FIG. 26, the file storage location is changed from BOX1 to BOX3.

In step S2806, the CPU 201 determines that the file process request is neither the file delete request nor the file storage location change request but another process request, and CPU 201 performs a process according to the process request. An example of the process request is a request to change a file name. In a case where it is determined that the process request is a request to change a file name, file information stored in the storage area A 401 in the MFP 101 is changed such that a file name of a specified file is changed.

In the first embodiment, as described above, when the MFP 101 is in the power saving state in which no electric power is supplied to the hard disk 211, even if a process request on a file stored in the MFP 101 is issued by another apparatus, the MFP 101 is maintained in the power saving state. When a process request on a file stored is issued by an apparatus to the MFP 101, the file process request packet addressed to the MFP 101 is received by the MFP 103 by proxy. After the MFP 101 returns into the normal power state from the power saving state, the file process request packet received by the MFP 103 by proxy is transferred to the MFP 101. Thus, the process request on the file stored in the MFP 101, which was issued when the MFP 101 was in the power saving state, is properly handled by the MFP 101.

Second Embodiment

A second embodiment is a modification to the first embodiment and is similar to the first embodiment except for steps described below.

In the first embodiment described above, when the MFP 103 receives from the MFP 102 a file process request packet originally addressed to the MFP 101, the MFP 103 stores the received file process request packet only if that file process request packet is a file delete request packet. Furthermore, in the first embodiment, the MFP 103 transmits the file delete request packet stored in the RAM 206 to the MFP 101 when the MFP 101 returns into the normal power state from the power saving state.

Figure 17:
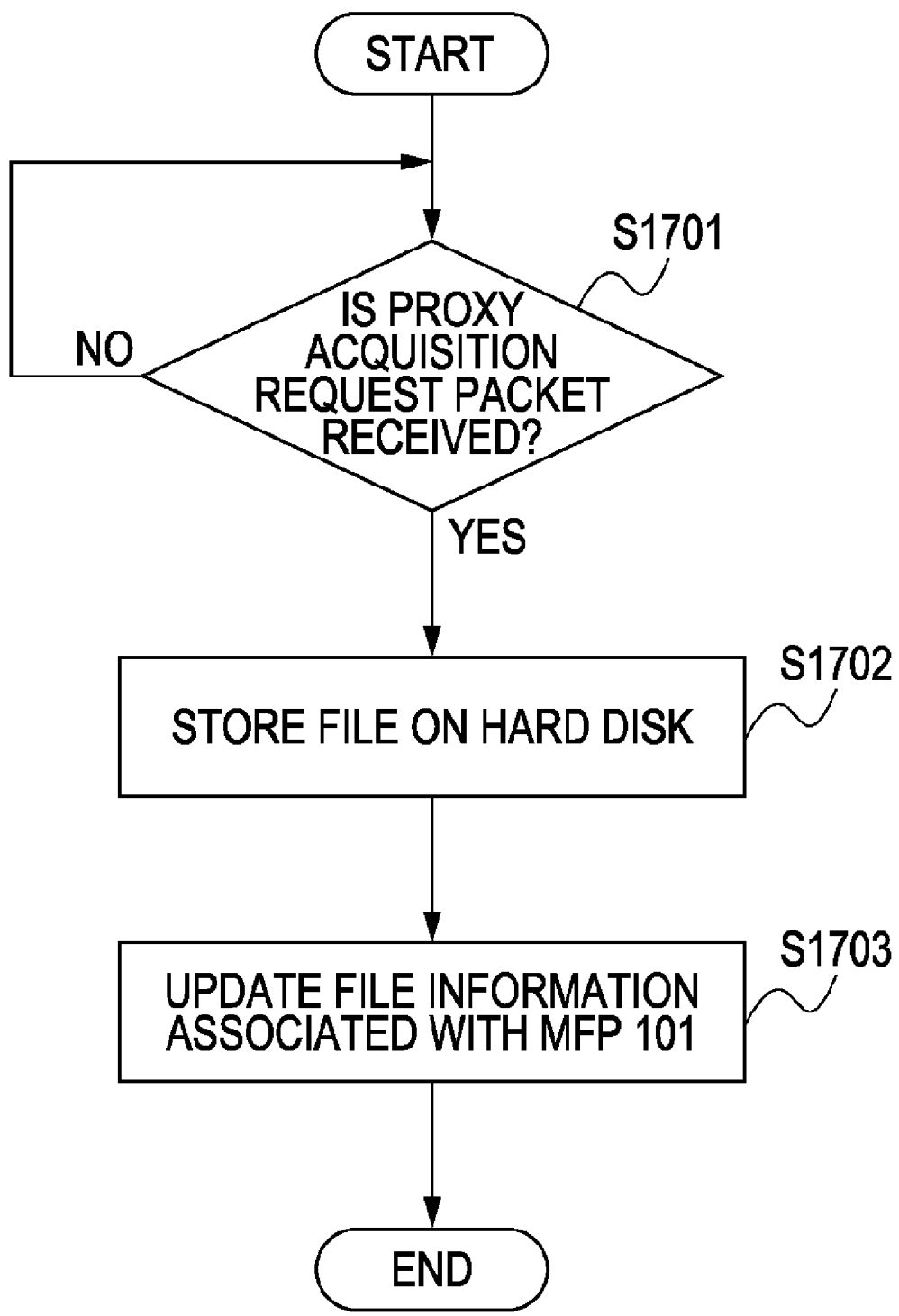
FIG. 17 is a flow chart illustrating a process performed by the MFP 103 when the MFP 103 receives a proxy acquisition request packet from the MFP 102.

In contrast, the second embodiment is different from the first embodiment in that a determination is performed as to whether a file specified to be deleted by a file delete request is included in a proxy acquisition request packet already received in step S1701 shown in FIG. 17.

In the second embodiment, if it is determined that the file specified to be deleted by the file delete request is included in the proxy acquisition request packet already received in step S1701 shown in FIG. 17, the CPU 201 of the MFP 103 does not perform step S2404 but, instead, the CPU 201 of the MFP 103 performs deleting such that the file data already acquired in the MFP 103 by proxy from the MFP 102 is deleted from the hard disk 211 of the MFP 103.

In the second embodiment, therefore, in a case where a file delete request packet received from the MFP 102 is for a file already acquired by proxy, the MFP 103 does not need to transmit the file delete request packet to the MFP 101. In this case, although otherwise the file acquired by proxy is to be transmitted in step S2205 in FIG. 22 to the MFP 101, the MFP 103 does not need to perform step S2205 because the file acquired by proxy has already been deleted.

In the second embodiment, as described above, in a case where a file delete request packet received from the MFP 102 is for a file already acquired by proxy in the MFP 103, the MFP 103 deletes the file acquired by proxy. That is, the MFP 103 does not need to transmit the file acquired by proxy to the MFP 101 when the MFP 101 returns into the normal power state from the power saving state.

Third Embodiment

A third embodiment is a modification to the first and second embodiments, and is similar to the first embodiment except for steps described below.

In the second embodiment described above, when a file specified to be deleted by a file delete request is included in a proxy acquisition request packet already received in step S1701 shown in FIG. 17, the MFP 103 deletes the specified file.

In the third embodiment, in contrast, when a file specified to be moved by a file move request packet is included in a proxy acquisition request packet already received in step S1701 shown in FIG. 17, the MFP 103 moves the specified file.

Figure 29:
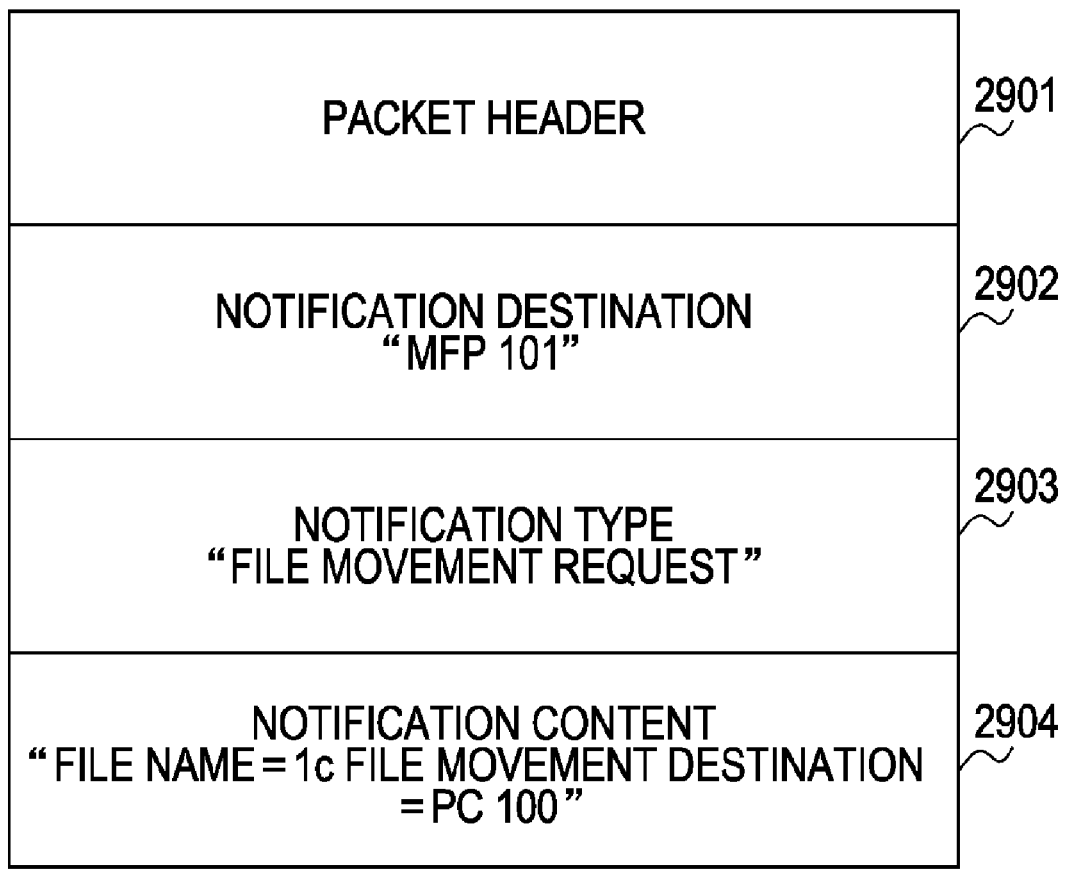
FIG. 29 is a diagram illustrating an example of a file move request packet.

FIG. 29 illustrates an example of a file move request packet. In a notification destination description field 2902, data is described to indicate that the MFP 101 is an MFP in which a file specified to be moved by a user of the MFP 102 is stored. In a notification type description field 2903, data is described to indicate that a file movement is requested to be performed. In a notification content field 2904, data is described to indicate a file name of the file requested by the user to be moved. Instead of the file name, a file ID may be described. Both the file name and the file ID may be described. In the example shown in FIG. 25, "1b" is described as the file name. Data described in notification content field 2904 indicates that the PC 100 is specified as a file movement destination.

Figure 30:
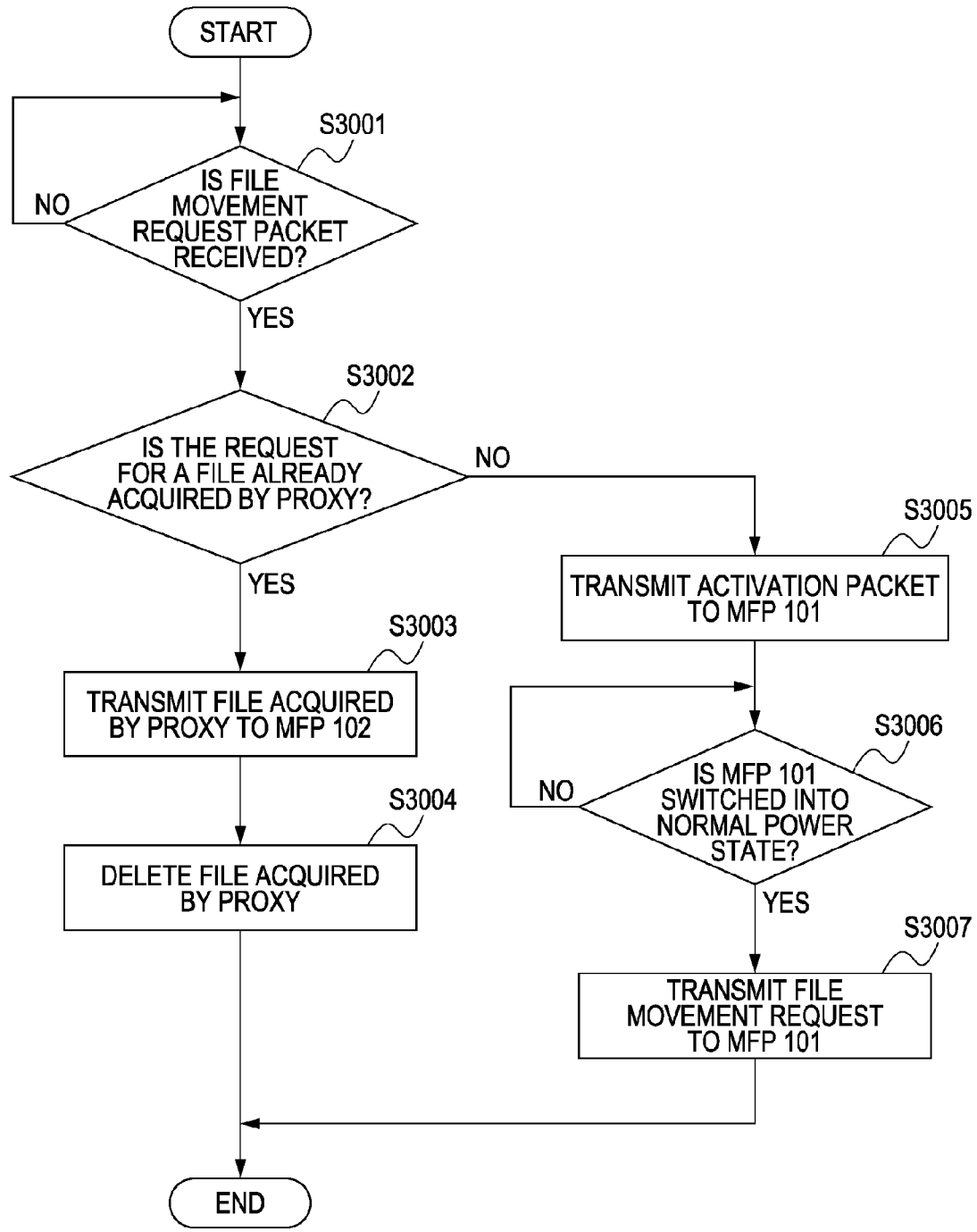
FIG. 30 is a flow chart illustrating a process performed by the MFP 103 when the MFP 103 receives, from the MFP 102, a file move request packet on a file stored in the MFP 101.

FIG. 30 is a flow chart illustrating a process performed by the MFP 103 when the MFP 103 receives, from the MFP 102, a file move request packet on a file stored in the MFP 101. Note that the MFP 103 receives a file move request packet from the MFP 102 when the MFP 101 is in the power saving state.

Steps in FIG. 30 are executed by the CPU 201 of the MFP 103. In the execution of these steps, the CPU 201 loads a control program into the RAM 206 from the hard disk 211 or the ROM 205 and executes it.

In step S3001, the CPU 201 of the MFP 103 determines whether a file move request packet such as that shown in FIG. 29 is received from the MFP 102. If it is determined that a file move request packet has been received, the CPU 201 advances the process to step S3002.

In step S3002, the CPU 201 determines whether the file (with file name=1b) to be moved according to the file move request packet is a file that has already been acquired by proxy in step S1701 in FIG. 17. If it is determined that the file has already been acquired by proxy, the CPU 201 advances the process to step S3003.

In step S3003, the CPU 201 instructs the network interface 202 to transmit the file with file name=1b already acquired by proxy to the MFP 102.

In step S3004, the CPU 201 instructs the hard disk controller 204 to delete the file with file name=1b from the hard disk 211.

On the other hand, in the case where the process proceeds to step S3005, the file requested to be moved has not been acquired by proxy, and thus the CPU 201 determines that, to respond to the file move request from the MFP 102, the MFP 101 should be returned into the normal power state. To get the MFP 101 to return into the normal power state from the power saving state, the CPU 201 instructs the network interface 202 to transmit an activation packet to the MFP 101.

In step S3006, the CPU 201 monitors whether the network interface 202 receives a notification from the MFP 101 that the MFP 101 has returned into the normal power state thereby determining whether the MFP 101 has returned into the normal power state. If it is determined that the network interface 202 has received a notification from the MFP 101 that the MFP 101 has returned into the normal power state, the CPU 201 advances the process to step S3007. When the MFP 102 receives the notification from the MFP 101 that the MFP 101 has returned into the normal power state, the MFP 102 changes the IP address management table 1100 from that shown n FIG. 18 to that shown in FIG. 11.

In step S3007, the CPU 201 instructs the network interface 202 to transmit the file move request packet received in step S3001 from the MFP 102 to the MFP 101 that has returned into the normal power state. If the MFP 101 receives the file move request packet after the MFP 101 has returned into the normal power state from the power saving state, the MFP 101 moves the file, specified by the file move request, to an apparatus specified as the file movement destination. Furthermore, the MFP 101 deletes the file from the hard disk 211 after the file is transmitted. For example, in a case where a file with file name=1b is requested to be moved by the file move request packet, the MFP 103 transmits in step S3007 the file move request packet to the MFP 101. In response, the MFP 101 moves the file with file name=1b to the file movement destination (for example, the PC 100) and deletes the file with file name=1b from the hard disk 211.

In the third embodiment, as described above, when a file move request packet received from the MFP 102 is for a file already acquired by proxy in the MFP 103, the MFP 103 moves the file acquired by proxy to a specified file movement destination. Thus, in the case where the file delete request packet received from the MFP 102 is for the file already acquired by proxy, the MFP 103 properly handles the file move request by returning the MFP 101 into the normal power state from the power saving state.

Other Embodiments

In the first embodiment described above, when the MFP 101 switches into the power saving state, the MFP 103 operates by proxy for the MFP 101. However, the MFPs may operate in a different manner. For example, the process performed by the MFP 101 in the first embodiment may be performed by the MFP 103, and the process performed by the MFP 103 in the first embodiment may be performed by the MFP 101.

In the third embodiment described above, a file move request packet is handled. Alternatively, a file copy request packet may be handled. In the case of file move request packets, when the MFP 103 receives a file move request packet, the MFP 103 performs a step (step S3004 in FIG. 30) to delete a file from a source apparatus. In contrast, in the case of file copy request packets, when the MFP 103 receives a file copy request packet, the MFP 103 does not delete a file from a source apparatus, and thus the MFP 103 does not perform the step (step S3004 in FIG. 30) to delete the file.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-323638, filed Dec. 19, 2008, which is hereby incorporated by reference herein in its entirety.

What is claimed is:

1. An information processing system comprising a first information processing apparatus and a second information processing apparatus comprising a storage unit capable of storing a file, the first information processing apparatus comprising:
a first receiving unit configured to receive file information indicating an attribute of the file stored in the storage unit from the second information processing apparatus when the second information processing apparatus changes a power state from a normal power state in which electric power is supplied to the storage unit into a power saving state in which electric power supply to the storage unit is cut off;
a second receiving unit configured to receive, when the second information processing apparatus is in the power saving state, an acquisition request for acquiring the file information;
a first transmitting unit configured to, when the second receiving unit receives the acquisition request, transmit the file information received by the first receiving unit to a sender of the acquisition request;
a third receiving unit configured to, when the second information processing apparatus is in the power saving state, receive a process request in terms of the file stored in the storage unit of the second information processing apparatus;

a determination unit configured to, when the third receiving unit receives the process request, determine whether an activation of the second information processing apparatus is necessary for a file operation based on the received processing request; and a second transmitting unit configured to, in a case where the determination unit determines that the activation of the second information processing apparatus is necessary for the file operation based on the received process request, transmit an instruction for activating the second information processing apparatus and transfer the received process request to the second information processing apparatus when the second information processing apparatus changes the power state from the power saving state into the normal power state in response to the instruction, and in a case where the determination unit determines that the activation of the second information processing apparatus is unnecessary for the file operation based on the received process request, transfer the received process request to the second information processing apparatus when the second information processing apparatus changes the power state from the power saving state into the normal power state in response to a different event, the second information processing apparatus comprising:
a third transmitting unit configured to transmit the file information to the first information processing apparatus when the second information processing apparatus switches into the power saving state;
a fourth receiving unit configured to receive the process request transmitted from the second transmitting unit when the second information processing apparatus switches from the power saving state into the normal power state in response to the instruction; and
a control unit configured to perform a control operation such that the file stored in the storage unit is processed in accordance with the process request received by the fourth receiving unit.

2. The information processing system according to claim 1, further comprising an updating unit configured to update the file information in accordance with the process request received by the third receiving unit, wherein
in a case where the process request received by the fourth receiving unit is a request to delete a file,
the updating unit deletes the file information associated with the file requested to be deleted, and
the control unit performs a control operation so as to delete the file requested to be deleted.

3. The information processing system according to claim 2, wherein in a case where the process request received by the fourth receiving unit is a request to change a storage location of the file, the control unit performs a control process so as to change the storage location of the file.

4. The information processing system according to claim 2, wherein the second information processing apparatus further comprising a fifth receiving unit configured to receive the file information updated by the updating unit, when the second information processing apparatus switches from the power saving state into the normal power state.

5. The information processing system according to claim 2, wherein the file information includes information indicating at least one of a file name of the file, an author of the file, and a creation date/time of the file.

6. The information processing system according to claim 2, wherein the first information processing apparatus further comprising:

a fifth receiving unit configured to receive the file to be stored in the storage unit of the second information processing apparatus when the second information processing apparatus is in the power saving state; and
a fourth transmitting unit configured to transmit the file received by the fifth receiving unit to the second information processing apparatus when the second information processing apparatus switches from the power saving state into the normal power state.

7. The information processing system according to claim 6, wherein in a case where the process request received by the fourth receiving unit is a request to delete the file received by the fifth receiving unit, the fourth transmitting unit does not transmit the file received by the fifth receiving unit to the second information processing apparatus even when the second information processing apparatus switches from the power saving state into the normal power state.

8. The information processing system according to claim 6, wherein in a case where the process request received by the fourth receiving unit is a request to move the file received by the fifth receiving unit, the fourth transmitting unit does not transmit the file received by the fifth receiving unit to the second information processing apparatus even when the second information processing apparatus switches from the power saving state into the normal power state.

9. The information processing system according to claim 1, further comprising:
an updating unit configured to, in a case where the determination unit determines that the activation of the second information processing apparatus is unnecessary, update the file information received by the first receiving unit in accordance with the file operation based on the process request received by the third receiving unit,
wherein, in a case where the second receiving unit receives the acquisition request for acquiring the file information again, the second transmitting unit transmits the updated file information to a sender of the acquisition request.

10. An information processing apparatus communicating with another information processing apparatus comprising a storage unit capable of storing a file, the information processing apparatus comprising:
a first receiving unit configured to receive file information indicating an attribute of the file stored in the storage unit from the other information processing apparatus when the other information processing apparatus changes a power state from a normal state in which electric power is supplied to the storage unit into a power saving state in which electric power supply to the storage unit is cut off;
a second receiving unit configured to receive, when the other information processing apparatus is in the power saving state, an acquisition request for acquiring the file information;
a first transmitting unit configured to, when the second receiving unit receives the acquisition request, transmit the file information received by the first receiving unit to a sender of the acquisition request;
a third receiving unit configured to, when the another information processing apparatus is in the power saving state, receive a process request in terms of the file stored in the storage unit of the another information processing apparatus;
a determination unit configured to, when the third receiving unit receives the process request, determine whether an activation of the other information processing apparatus is necessary for a file operation based on the received process request; and a second transmitting unit configured, in a case where the determination unit determines that the activation of the other information processing apparatus is necessary for the file operation based on the received process request, transmit an instruction for activating the other information processing apparatus and transfer the received process request to the other information processing apparatus when the other information processing apparatus changes the power state from the power saving state into the normal power state in response to the instruction, and in a case where the determination unit determines that the activation of the other information processing apparatus is unnecessary for the file operation based on the received process request, transfer the received process request to the other information processing apparatus when the other information processing apparatus changes the power state from the power saving state into the normal power state in response to a different event.

11. The information processing apparatus according to claim 10, further comprising an updating unit configured to update the file information in accordance with the process request received by the third receiving unit, wherein in a case where the process request received by the third receiving unit is a request to delete a file, the updating unit deletes the file information associated with the file requested to be deleted.

12. The information processing apparatus according to claim 10, wherein the file information includes information indicating at least one of a file name of the file, an author of the file, and a creation date/time of the file.

13. The information processing apparatus according to claim 10, further comprising:
an updating unit configured to, in a case where the determination unit determines that the activation of the second information processing apparatus is unnecessary, update the file information received by the first receiving unit in accordance with the file operation based on the process request received by the third receiving unit,
wherein, in a case where the second receiving unit receives the acquisition request for acquiring the file information again, the second transmitting unit transmits the updated file information to a sender of the acquisition request.

14. An information processing method in an information processing system including a first information processing apparatus and a second information processing apparatus comprising a storage unit capable of storing a file, the method comprising:
in the second information processing apparatus, receiving file information indicating an attribute of the file stored in the storage unit from the second information processing apparatus when the second information processing apparatus changes a power state from a normal power state in which electric power is supplied to the storage unit into a power saving state in which electric power supply to the storage unit is cut off;
in the first information processing apparatus, receiving an acquisition request for acquiring the file information when the second information processing apparatus is in the power saving state;
if the first information processing apparatus receives the acquisition request, transmitting the file information from the first information processing apparatus to a sender of the acquisition request;
in the first information processing apparatus, receiving a process request in terms of the file stored in the storage unit of the second information processing apparatus when the second information processing apparatus is in the power saving state;
in the first information processing apparatus, if the process request is received, determining whether an activation of the second information processing apparatus is necessary for a file operation based on the received process request;
in the first information processing apparatus, in a case where it is determined that the activation of the second information processing apparatus is necessary for the file operation based on the received process request, transmitting an instruction for activating the second information processing apparatus and transferring the received process request to the second information processing apparatus when the second information processing apparatus changes the power state from the power saving state into the normal power state in response to the instruction, and in a case where it is determined that the activation of the second information processing apparatus is unnecessary for the file operation based on the received process request, transferring the received process request to the second information processing apparatus when the second information processing apparatus changes the power state from the power saving state into the normal power state in response to a different event.

15. The information processing method according to claim 14, wherein in the first information processing apparatus, in a case where the process request is a request to delete a file,
the updating is performed so as to delete the file information associated with the file specified to be deleted, and
the controlling is performed such that the file specified to be deleted is deleted.

16. The information processing method according to claim 14, wherein the file information includes information indicating at least one of a file name of the file, an author of the file, and a creation date/time of the file.

17. The information processing method according to claim 14, further comprising:
in a case where it is determined that the activation of the second information processing apparatus is unnecessary, updating the file information received by the first receiving unit in accordance with the file operation based on the process request received by the third receiving unit; and
in a case where the acquisition request for acquiring the file information is received again, transmitting the updated file information to a sender of the acquisition request.

* * * * *